(12) United States Patent
Steinberger et al.

(10) Patent No.: US 12,099,132 B2
(45) Date of Patent: Sep. 24, 2024

(54) USING REFERENCE MEASUREMENTS TO REDUCE GEOSPATIAL UNCERTAINTY

(71) Applicant: Auki Labs AG, Zug (CH)

(72) Inventors: John Steinberger, Geneva (CH); Nils Pihl, Hong Kong (CN)

(73) Assignee: Auki Labs AG, Zug (CH)

( * ) Notice: Subject to any disclaimer, the term of this patent is extended or adjusted under 35 U.S.C. 154(b) by 181 days.

(21) Appl. No.: 17/727,029

(22) Filed: Apr. 22, 2022

(65) Prior Publication Data

US 2023/0341501 A1 Oct. 26, 2023

(51) Int. Cl.
| | |
|---|---|
| *G01S 5/02* | (2010.01) |
| *G01S 19/48* | (2010.01) |
| G01C 21/32 | (2006.01) |
| G01S 19/45 | (2010.01) |
| G09B 29/10 | (2006.01) |

(52) U.S. Cl.
CPC .......... *G01S 5/0244* (2020.05); *G01S 5/0258* (2020.05); *G01S 19/48* (2013.01); *G01C 21/32* (2013.01); *G01S 5/0263* (2013.01); *G01S 19/45* (2013.01); *G09B 29/10* (2013.01)

(58) Field of Classification Search
CPC ........ G01S 5/0244; G01S 5/02; G01S 5/0257; G01S 5/0258; G01S 5/0263; G01S 19/45; G01S 19/48; G01C 21/20; G01C 21/32
USPC ............................... 342/450, 357.29, 357.31
See application file for complete search history.

(56) References Cited

U.S. PATENT DOCUMENTS

| | | | | |
|---|---|---|---|---|
| 7,443,338 | B2 * | 10/2008 | Wakamatsu | G01S 19/28 |
| | | | | 342/357.23 |
| 9,998,866 | B2 * | 6/2018 | Natucci, Jr. | H04W 4/022 |
| 10,444,021 | B2 * | 10/2019 | Hare | G06F 16/29 |
| 10,509,096 | B2 * | 12/2019 | Lin | G01S 5/14 |
| 10,937,191 | B2 * | 3/2021 | Iyer | G01C 3/14 |
| 11,215,465 | B2 * | 1/2022 | Hare | G01C 21/3848 |
| 11,243,288 | B2 * | 2/2022 | Lin | G01S 5/02521 |
| 2010/0324813 | A1 * | 12/2010 | Sundararajan | G01S 5/14 |
| | | | | 342/450 |

FOREIGN PATENT DOCUMENTS

| | | | | |
|---|---|---|---|---|
| EP | 4152039 A1 * | 3/2023 | | G01S 5/02 |
| JP | 2017067727 A | 4/2017 | | |
| WO | 2021091989 A1 | 5/2021 | | |

\* cited by examiner

*Primary Examiner* — Chuong P Nguyen
(74) *Attorney, Agent, or Firm* — Haley Guiliano LLP

(57) ABSTRACT

Systems and methods for minimizing uncertainty in a geospatial location measurement. First and second positional data of a first reference marker are received, each comprising an uncertainty radius about a preliminary coordinate. A first translation vector comprising the displacement to the first reference marker from the second reference marker is received. The second uncertainty radius is translated by the first translation vector and, based on an intersection area of the translated second uncertainty radius and the first uncertainty radius, the first uncertainty radius is reduced to the intersection area.

36 Claims, 15 Drawing Sheets

USING REFERENCE MEASUREMENTS TO REDUCE GEOSPATIAL UNCERTAINTY

TECHNICAL FIELD

The present disclosure relates to systems for determining a geospatial location and, more particularly, to systems and related processes for reducing uncertainty in geospatial uncertainty, iteratively, with the use of virtual reference measurements.

BACKGROUND

The specific geospatial location (e.g., longitude and latitude) received and returned by consumer devices is inherently inaccurate, typically, in the case of the global positioning system (GPS), with a resolution of a few meters of the exact (e.g., true) geospatial location of the device. Although a physical location can be fairly accurately described in terms of geospatial coordinates (e.g., longitude, latitude, altitude) on a map, due to the granularity of the measurement (e.g., meters) the exact location of a device or user relative to the world and the map is uncertain. Often, the location is normally given a preliminary coordinate, owing to the uncertainty. Accordingly, querying a device about the exact location of the device, with a resolution appropriate to the device, or something in the device's field of view, is inherently inaccurate.

SUMMARY

In view of the foregoing, the present disclosure provides systems and related methods that minimize uncertainty in a location measurement (e.g., GPS, ultrawideband, GLONASS, Wi-Fi) by referencing and trusting reference measurements (e.g., measurements carried out locally, using a distance and direction application or algorithm such as simultaneous learning and mapping algorithms). Once the exact displacement between at least two reference markers is known, the uncertainty in geospatial coordinates can iteratively be reduced by eliminating areas that are impossible for candidates of the true location of the marker to be, this is achieved by translating either of the uncertainty radii to the other using the measured displacement between the two reference markers, as will be described and explained in more detail below.

In a first approach, there is provided a method minimizing uncertainty in a geospatial location measurement. The method comprises receiving first and second positional data of a first reference marker, the first and second positional data comprising a second uncertainty radius about a second preliminary coordinate. For example, the user scans on a user device a reference marker (in this example two reference markers, but 1+N is possible) such as a QR code, or taps an NFC tag, and receives a GPS location with a certainty radius for each of the reference markers. A first translation vector comprising the displacement to the first reference marker from the second reference marker can be received, calculated or measured. For example, using an augmented reality measurement tool that utilizes the built-in SLAM functionality and accelerometers of the user device, the displacement (i.e., the distance and direction) to the first reference marker from the second reference marker can be measured or calculated and then received to be used further in the method. Knowing the translation vector comprising the displacement between the reference markers, the smallest uncertainty radius, the second uncertainty radius, is translated, by the first translation vector. In some examples, the translation is made from any point within the second uncertainty radius. The intersection between the overlapping uncertainty radii of the first uncertainty radius and the translated second uncertainty radius replaces the first uncertainty radius, thus the first uncertainty radius is reduced to the intersection area and the uncertainty in the geospatial measurement has been reduced. The intersection may be referred to as a reduced radius or the like, the term "reduced radius" serving in this context as a label for an arbitrary convex shape, or substantially convex shape.

In some examples, the method further comprises iteratively repeating the translation and reduction of the uncertainty radius. For example, the newly reduced radius (which may in practice be an odd shape or volume) can now be translated to the second preliminary coordinate, and so on until the certainty radius of both the first and second positional data is minimized. In some examples, the method further comprises halting the iterative process when the first radius reaches a threshold. In the general case (i.e., more than two measurements) the threshold may be before computing all the translations and intersections possible from the N+1 measurements for N intersections if a sufficient uncertainty radius has been achieved. Accordingly, in some examples, the threshold may be based on an ideal uncertainty radius size, after a total number of iterations (e.g., 1 iteration per N measurements, or 10 iterations total), after the expiration of a timer, and/or when the resolution of the uncertainty (e.g., the uncertainty radius) is the same order of magnitude as the user device. For example, the iterative process may be halted when the radii of uncertainty are less than 10 mm, after 20 iterations, 5 seconds, or the size of the user device. It should be understood that these examples are given for illustration of the configuration of the threshold of the iterative process. It is noted that for a large sample size, e.g. 100 measurements, it is possible that after 99 intersections of uncertainty radii, only an empty set remains because some measurements were contradictory, specifically, the uncertainty radius was just an indication, and it was erroneous for 1 of the measurements, which invalidates the intersection. Therefore, such erroneous samples may be identified by repeating a different combination of intersections less than N and halting the process when a suitable uncertainty radius (i.e., resolution) has been achieved.

In some examples, the method further comprises capturing, by a camera on a user device, the first and second reference markers. The method may also comprise storing the first positional data and second positional data into a temporary local coordinate space stored on the user device. To measure the displacement (i.e., a three-dimensional vector comprising both a distance and a direction) between the two or more reference markers, the location of the reference markers being converted to a local coordinate system (e.g., a virtual coordinate space), often referred to herein as a neospatial coordinate system. The displacement between two reference markers and the translation vector between two reference markers are therefore equivalent terms. In some examples, the method comprises performing, on the user device, a simultaneous learning and mapping (SLAM) algorithm to obtain a displacement (e.g., an absolute distance and direction) between the first reference marker and the second marker in the local coordinate space.

In some examples, the method further comprises receiving third positional data of a third reference marker, the third positional data comprising a third uncertainty radius about a third preliminary coordinate. The method may also further comprise receiving, measuring, or calculating a second translation vector comprising the displacement from the first reference marker to the third reference marker. The method may further comprise translating the reduced first uncertainty radius, by the second translation vector; and based on an intersection area of the translated reduced first uncertainty radius and the third uncertainty radius, reducing the third uncertainty radius to the intersection area.

In some examples, the method further comprises capturing, by a camera on a user device, the first and third reference markers; storing the first positional data and third positional data into a temporary local coordinate system stored on the user device; and performing, on the user device, a simultaneous learning and mapping, SLAM, algorithm to obtain an absolute distance between the first and third marker in the local coordinate system, and with a known orientation then obtain a displacement from the first marker to the third marker (e.g., a virtual coordinate space stored locally on the user device with a known orientation with respect to a global coordinate system). For example, a scanning apparatus in communication with the first user device may be used to scan reference markers or additional reference markers; such a device may be installed on a car, tricycle, boat, snowmobile, and underwater apparatus, as well as on a backpack to be carried on foot.

In some examples, the user device is a second user device, different to the first user device. In some examples, the first and second marker are the same marker recorded at two different points in time by the same user device. In this way, the translation vector may be 0, but the intersectional area between the two uncertainty radii measured at a first time, T1, and a second time, T2, can be intersected to reduce the uncertainty in the location of the marker.

In another approach, there is provided with a media device comprising a control module, a transceiver module and a network module, configured to: receive first positional data of a first reference marker, the first positional data comprising a first uncertainty radius about a first preliminary coordinate; receive second positional data of a second reference marker, the second positional data comprising a second uncertainty radius about a second preliminary coordinate; receive a first translation vector comprising the displacement to the first reference marker from the second reference marker; translate the second uncertainty radius, by the first translation vector; and based on an intersection area of the translated second uncertainty radius and the first uncertainty radius, reduce the first uncertainty radius to the intersection area.

In another approach, there is provided a non-transitory computer-readable medium, having instructions recorded thereon which, when executed, carry out a method, for minimizing uncertainty in a location measurement, the method comprising: receiving first positional data of a first reference marker, the first positional data comprising a first uncertainty radius about a first preliminary coordinate; receiving second positional data of a second reference marker, the second positional data comprising a second uncertainty radius about a second preliminary coordinate; receiving a first translation vector comprising the displacement to the first reference marker from the second reference marker; translating the second uncertainty radius, by the first translation vector; and based on an intersection area of the translated second uncertainty radius and the first uncertainty radius, reducing the first uncertainty radius to the intersection area.

In another approach, there is provided a system for minimizing uncertainty in a location measurement, the system comprising: means for receiving first positional data of a first reference marker, the first positional data comprising a first uncertainty radius about a first preliminary coordinate; means for receiving second positional data of a second reference marker, the second positional data comprising a second uncertainty radius about a second preliminary coordinate; means for receiving a first translation vector between the first reference marker and the second reference marker; means for translating the second uncertainty radius, by the first translation vector; and based on an intersection area of the translated second uncertainty radius and the first uncertainty radius, means for reducing the first uncertainty radius to the intersection area.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

As briefly described above, the geospatial uncertainty in current GPS technology can be minimized by receiving first and second positional data of a first reference marker, each comprising an uncertainty radius about a preliminary coordinate. Receiving a first translation vector comprising the displacement to the first reference marker from the second reference marker. Translating the second uncertainty radius by the first translation vector and, based on an intersection area of the translated second uncertainty radius and the first uncertainty radius, reducing the first uncertainty radius to the intersection area between the first and second uncertainty radius. Such a modality can be implemented on, for example, a GPS device.

GPS technology has become widely available and is now commonly used by user devices, such as smartphones and the like. A GPS receiver, for example, inside a user device, calculates its four-dimensional position in spacetime based on data received from multiple GPS satellites. Each satellite carries an accurate record of its position and time and transmits that data to the receiver. The satellites carry very stable atomic clocks that are synchronized with one another and with ground clocks. Any drift from time maintained on the ground is corrected daily. In the same manner, the satellite locations are known with great precision. GPS receivers located in the user devices have clocks as well, but they are less stable and less precise, creating uncertainty in the measurements. Since the speed of radio waves is constant and independent of the satellite speed, the time delay between when the satellite transmits a signal and the receiver receives it is proportional to the distance from the satellite to the receiver. At a minimum, four satellites must be in view of the receiver for it to compute four unknown quantities (three position coordinates and the deviation of its own clock from satellite time). However, the uncertainty and the resolution of GPS are limited by the capabilities of the user device. Accordingly, it is desirable to have a method of improving the uncertainty of a GPS location, in other ways. GPS technology is not the only common geospatial location data that is becoming or has become widely available; ultrawideband (UWB), home-based mesh Wi-Fi and the like may also be the basis of the location measurements that require uncertainty to be improved upon.

Figure 1:
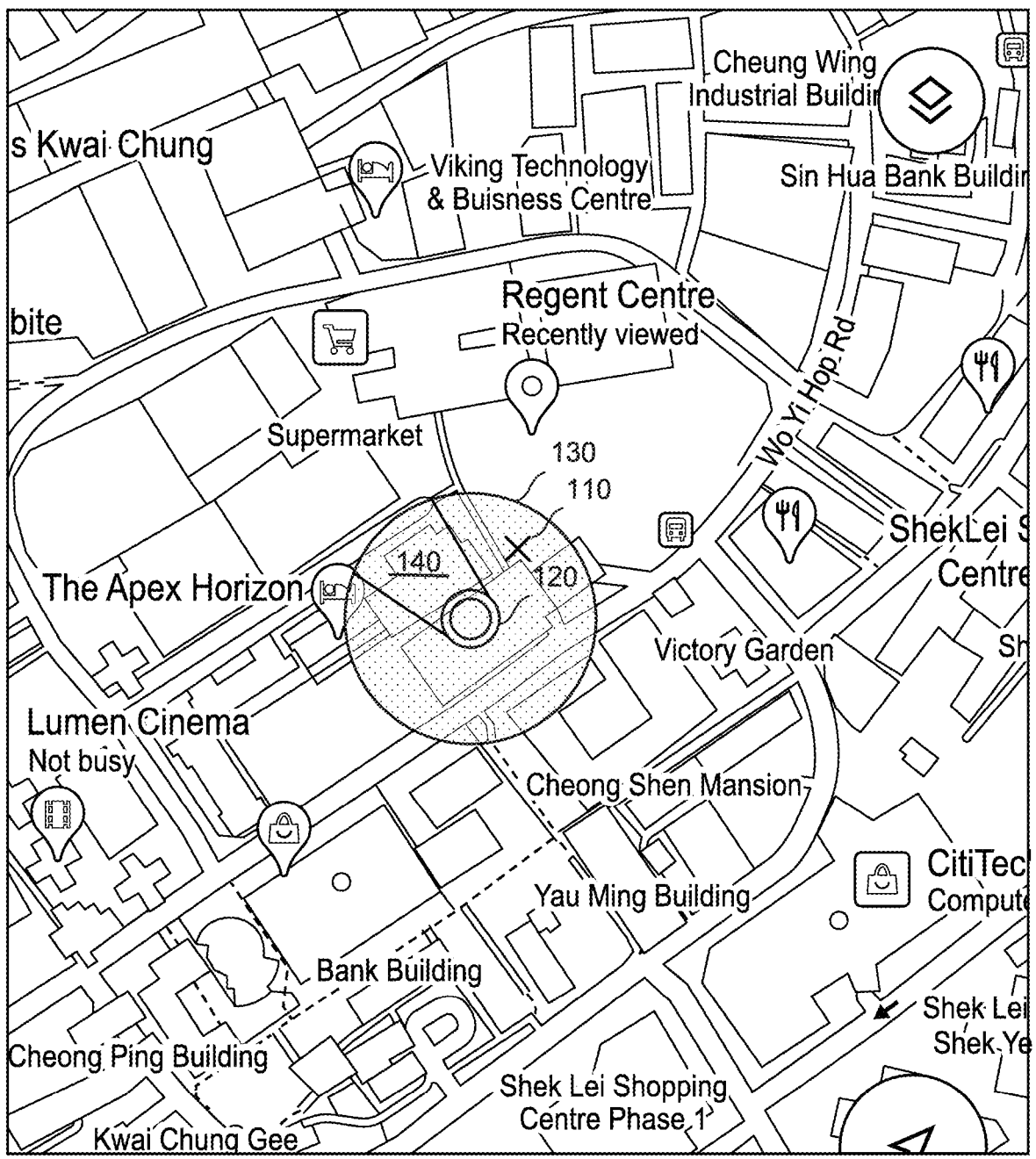
FIG. 1 is an illustrative diagram of a mapping application locating a user with GPS technology, in accordance with some embodiments of the disclosure.

FIG. 1 is an illustrative diagram of a mapping application locating a user 110 with GPS technology, in accordance with some embodiments of the disclosure. User 110 is located at an "X" on the map of the mapping application on a smartphone device (e.g., a user device). User 110 has initiated a "locate me," or similar, feature of the mapping application to find their location on the map of the mapping application. The mapping application has returned a preliminary geospatial coordinate 120 with an uncertainty radius 130. In some examples, the mapping application also returns a field of view 140 of the user 110 or rather the user's device.

Geospatial data is information that describes objects, events or other features with a location on or near the surface of the earth. Geospatial data typically combines location information (usually coordinates on the earth) and attribute information (the characteristics of the object, event or phenomena concerned) with temporal information (the time or life span at which the location and attributes exist). The location provided may be static in the short term (for example, the location of a piece of equipment, an earthquake event, children living in poverty) or dynamic (for example, a moving vehicle or pedestrian, the spread of an infectious disease). Geospatial data typically involves large sets of spatial data gleaned from many diverse sources in varying formats and can include information such as census data, satellite imagery, weather data, cell phone data, drawn images and social media data. Geospatial data is most useful when it can be discovered, shared, analyzed and used in combination with traditional business data. Geospatial data and/or geographic data and information are defined in the ISO/TC 211 series of standards as data and information having an implicit or explicit association with a location relative to Earth (a geographic location or geographic position). It is also called geospatial data and information, georeferenced data and information, as well as geodata and geoinformation. Approximately 90% of government sourced data has a location component.

As shown in FIG. 1, the preliminary coordinate 120 is not centered on the actual user's location at 110. This is due to the lack of precision in user devices utilizing geospatial location technologies. The GPS coordinate received and returned by consumer devices is inherently inaccurate, typically only being able of placing the device within a few meters of the exact geospatial location. Although a physical location can be accurately described in terms of geospatial coordinates (e.g., longitude, latitude, altitude) on a map, the location of the user device relative to the world and the map remains uncertain. This disclosure comprises details on querying the exact location of a device or reference markers scanned by the device and reducing the uncertainty of the returned query. Also shown in FIG. 1, the device returns a preliminary coordinate and an uncertainty radius, and the exact location is found somewhere within the circle expressed by the product of the uncertainty radius and the preliminary coordinate.

Figure 2:
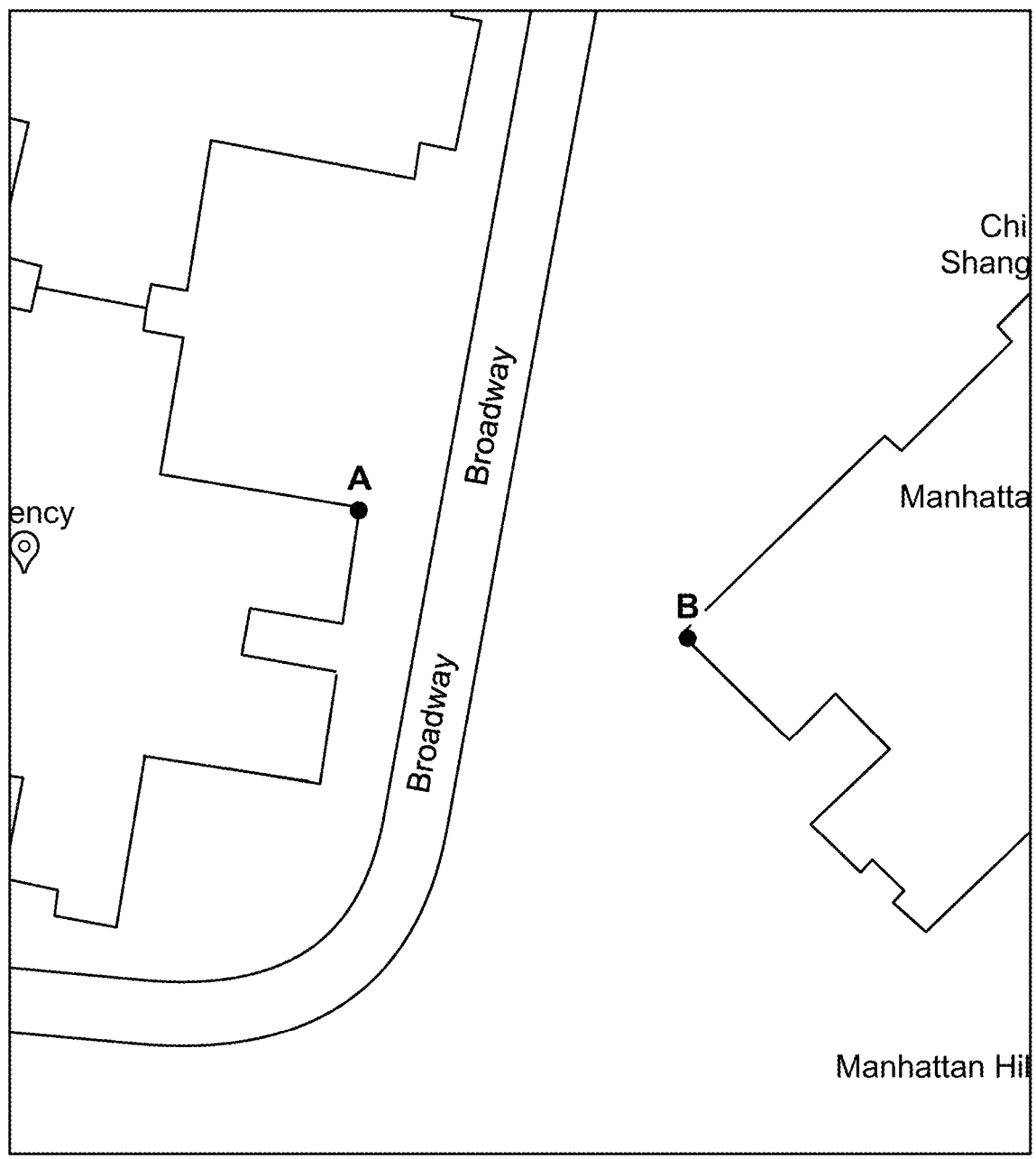
FIG. 2 is an illustrative diagram of a reference markers in a locality, in accordance with some embodiments of the disclosure.

FIG. 2 is an illustrative diagram of reference markers in a locality, in accordance with some embodiments of the disclosure. Shown in FIG. 2 are two reference markers, reference marker A and reference marker B. Each reference marker displays obtainable (e.g., machine-detectable or machine-readable) unique encoded information. For example, the reference markers may be considered machine-readable labels, or the like. For example, the machine-readable label may be a two-dimensional code, such as a QR code. In some examples, the reference marker may be a near-field communication (NFC) tag that the user device can query to receive the reference marker data.

The reference markers also trigger the user device to determine the current geospatial location (e.g., the current position and orientation of the user device) of the user device. For example, in a scenario where there are placed two markers (A and B, as shown in FIG. 2) at two locations, these markers when read by a user device, will have geospatial coordinates with varying degrees of uncertainty. The user device is configured to obtain known physical dimensions and the appearance of the reference object(s). By the term "known", as in "known physical dimensions and appearance", it should be understood that the physical dimensions and appearances of the reference markers predetermined. In other words, the reference object has physical dimensions and appearance which are known in advance such that it can be compared to the apparent dimensions and appearance of the imaged reference object.

Figure 3:
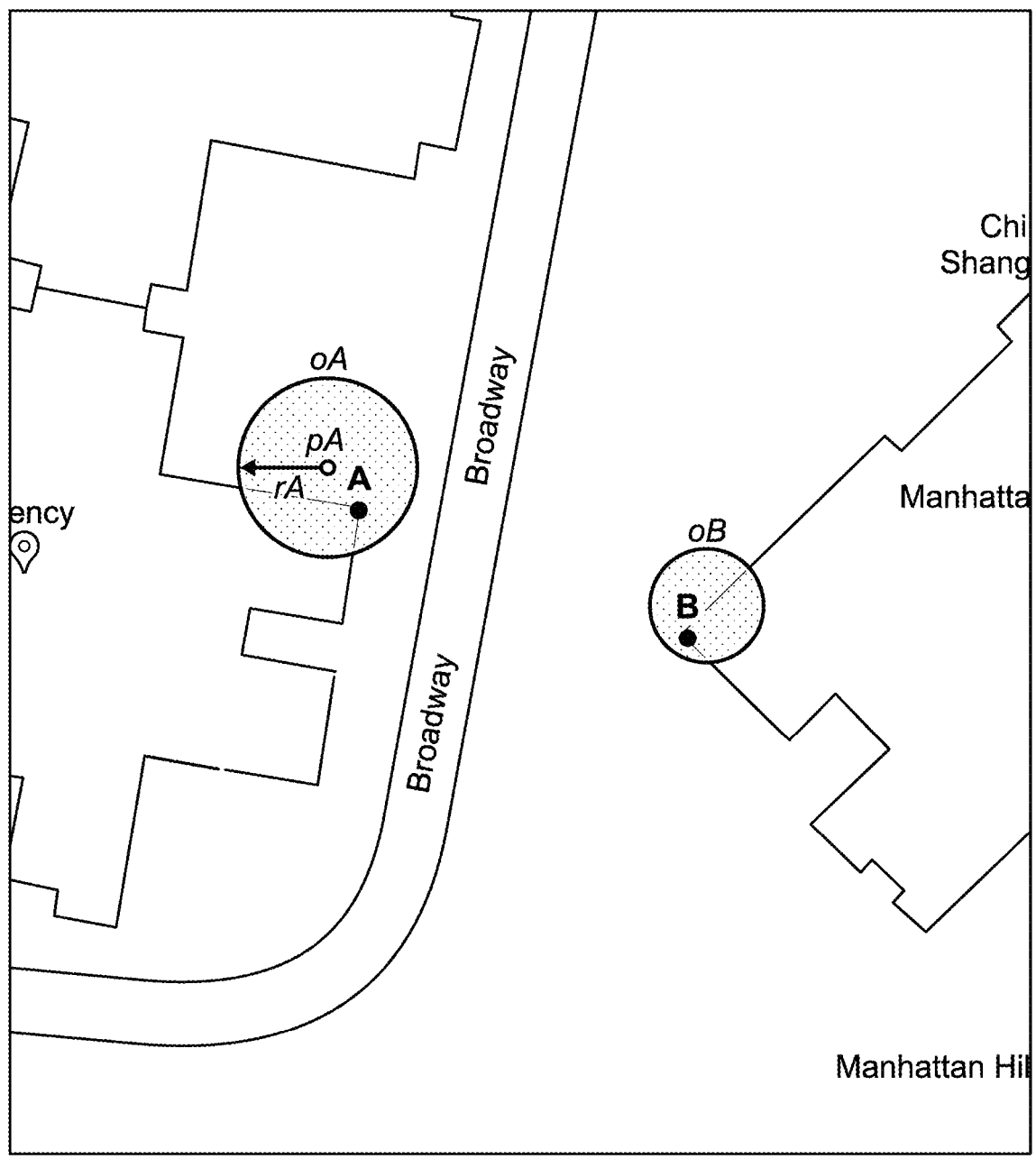
FIG. 3 is an illustrative diagram of the geospatial uncertainty of reference markers, in accordance with some embodiments of the disclosure.

FIG. 3 is an illustrative diagram of the geospatial uncertainty of a user when scanning reference markers, in accordance with some embodiments of the disclosure. Shown in FIG. 3 is the geospatial location and uncertainty of the markers, A and B. Each marker has a geospatial location expressed as a tuple of a preliminary coordinate (pn) and an uncertainty radius (rn), where n is either A or B, in this example. After scanning the markers, all that is known is that each marker is somewhere in the area created by using the uncertainty radius and the preliminary coordinate. For example, marker A is inside the area, oA, created by preliminary coordinate, pA, and uncertainty radius, rA.

Figure 4A:
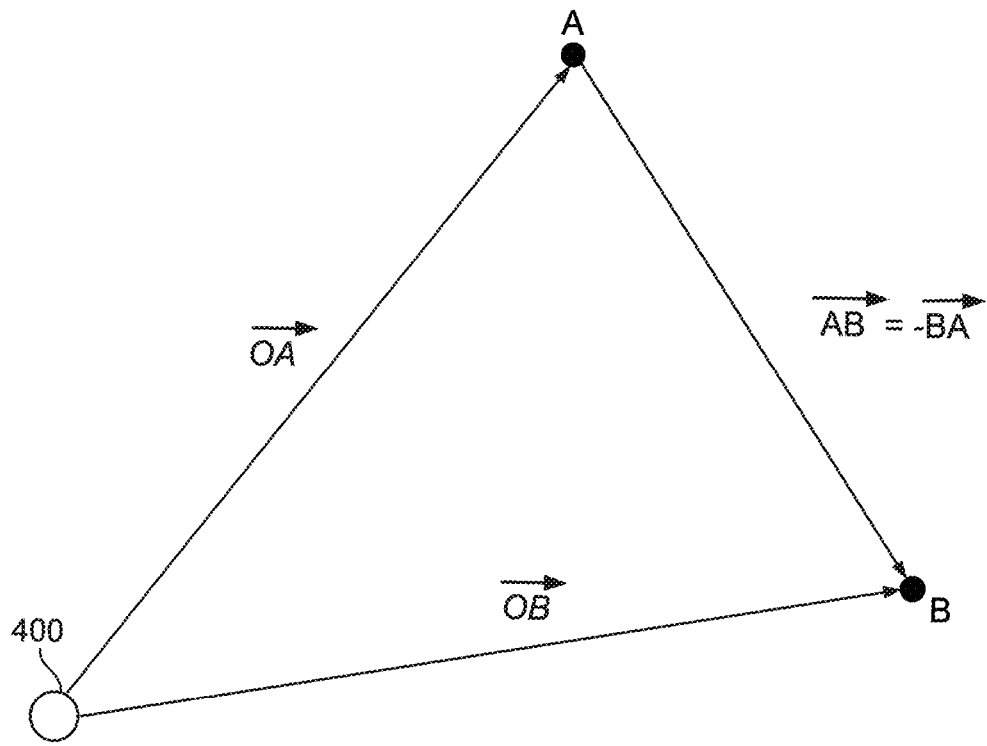
FIGS. 4A and 4B are exemplary illustrations of how positional and translation vectors between reference points in a neospatial environment can be generated, in accordance with some embodiments of the disclosure.
Figure 4B:
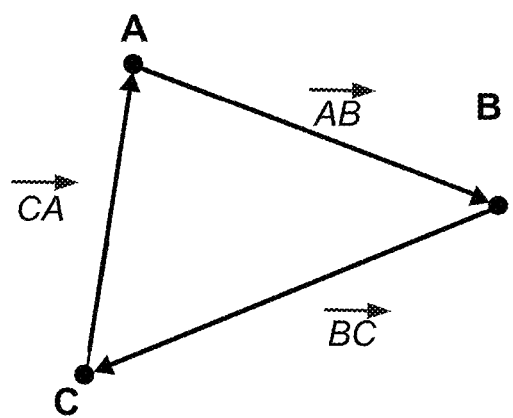

FIGS. 4A and 4B are exemplary illustrations of how positional and translation vectors between reference points in a neospatial environment can be generated, in accordance with some embodiments of the disclosure. Shown in FIGS. 4A and 4B are an origin point 100, reference point A, reference point B, reference point C, and a plurality of positional vectors.

In geometry, a positional or position vector, also known as a location vector or radius vector, is a Euclidean vector that represents the position of a point P in space in relation to an arbitrary reference origin, O, 100. Usually denoted x, r, or s, it corresponds to the straight line segment from O to P. In other words, it is the displacement or translation that maps the origin to P:

$$r = \overrightarrow{OP}$$

The term "position vector" is used mostly in the fields of differential geometry, mechanics and occasionally vector calculus. Frequently this is used in two-dimensional (2D) or three-dimensional (3D) spaces (e.g., in a video game environment) but can be easily generalized to Euclidean spaces and affine spaces of any dimension. This is relevant for the present disclosure in reducing the spatial uncertainty of a user because current GPS technologies only consider a 2D "top-down" approach, and the present disclosure enables, for example, a 3D consideration of a user's location or the user's device. In three dimensions, any set of three-dimensional coordinates and their corresponding basis vectors can be used to define the location of a point in space—whichever is the simplest for the task at hand may be used.

Referring to FIG. 4A, vector $\overrightarrow{OA}$ is a first positional vector that shows the position of reference point A, from the origin point 100. The origin 100, is a common origin among all objects within the environment. Similarly, $\overrightarrow{OB}$ is a second positional vector that shows the position of reference point B, from the origin 100.

Commonly, one uses the familiar Cartesian coordinate system, or sometimes spherical polar coordinates, or cylindrical coordinates:

$$r(t) \equiv r(x, y, z) \equiv x(t)\hat{e}_x + y(t)\hat{e}_y + z(t)\hat{e}_z$$
$$\equiv r(r, \theta, \varphi) \equiv r(t)\hat{e}_r(\theta(t), \varphi(t))$$
$$\equiv r(r, \theta, z) \equiv r(t)\hat{e}_r(\theta(t)) + z(t)\hat{e}_z$$

where t is a parameter, owing to their rectangular or circular symmetry. These different coordinates and corresponding basis vectors represent the same position vector, r. The choice of coordinate system is largely determined by the level of resolution required. For example, if millimeter precision in a geospatial certainty is required, a volumetric approach with spherical polar coordinates may be most appropriate. Another factor in the choice of the coordinate system may be the computational power of the system making the measurements. In the first instance, and for the remaining examples, the Cartesian coordinate system will be used for its ubiquity. The coordinate system chosen may be local to a user device, and used to temporarily store the location of reference markers, between which a displacement vector can be calculated.

Although Cartesian coordinates are straightforward for many applications, for some types of motion of an object of interest it might be necessary or more efficient to work in one of the non-linear coordinate systems, such as the polar- or cylindrical-coordinates. For example, if an avatar or user is in constant motion around an environment, this motion involves circular interpolation around a plurality of points of reference, therefore, polar coordinates might be more convenient to work in than Cartesian coordinates. Spherical Polar coordinates define a position in 2-D or 3-D space using a combination of linear and angular units. With spherical polar coordinates, a point is specified by a straight-line distance from a reference point (typically the origin 100 or the center of the user's point of view 110, 120), and an angle or two from a reference direction. These are referred to as the radial and angular coordinates (r, θ) or (r, θ, φ) in 2-D and 3-D respectively.

A cylindrical coordinate system is a three-dimensional coordinate system that specifies point positions by the distance from a chosen reference axis, such as an axis at origin 100 (not shown), the direction from the axis relative to a chosen reference direction (typically the positive X-direction), and the distance from a chosen reference plane perpendicular to the axis. The latter distance is given as a positive or negative number depending on which side of the reference plane faces the point. The power, and indeed the origin of, the cylindrical coordinate system is the point where all three coordinates can be given as zero. This is the intersection between the reference plane and the axis.

Recall from above that with Cartesian coordinates, any point in space can be defined by only one set of coordinates. A key difference when using polar coordinates is that the polar system allows a theoretically infinite number of coordinate sets to describe any point. Accordingly, by way of a summary, spherical polar coordinates are likely to be the preferred choice for reducing a geospatial uncertainty to a minimum, by way of minimization or reaching a threshold volume of uncertainty. However, the simplicity of Cartesian coordinates may be utilized on hardware with processing limitations, such as mobile devices or the like, and cylindrical coordinates in connection with objects that have some rotational symmetry about the longitudinal axis (e.g., mapping of a stadium with a reference marker in the centre of the stadium).

Referring back to FIG. 4A the vectors $\overrightarrow{AB}$ and $\overrightarrow{BA}$ are translation vectors that describe a translation from reference point A to reference point B, or point B to point A, respectively. In Euclidean geometry, a translation is a geometric transformation that moves every point of a figure, shape or space by the same distance in a given direction. A translation can also be interpreted as the addition of a constant vector to every point, or as shifting the origin of the coordinate system. Accordingly, the translation in the neo-spatial environment can be applied to the origin position 100, or the position of a reference point, A, B, or C.

In classical physics, translational motion is a movement that changes the position of an object, as opposed to rotation. For example, a translation is an operation changing the positions of all points (x, y, z) of an object according to the formula $$(x,y,z) \rightarrow (x+\Delta x, y+\Delta y, z+\Delta z)$$

where (Δx, Δy, Δz) is the same displacement for each point of the object. The translation vector (Δx, Δy, Δz) common to all points of the object describes a particular type of displacement of the object, usually called a linear displacement to distinguish it from displacements involving rotation, called angular displacements. In some scenarios, a translation vector alone will be sufficient to determine how to correct the positional information, however, in some examples, in particular for reference markers in the real-world environment, a translation vector is likely to be accompanied by a rotation or rotation vector, which will be described in more detail below.

Accordingly, after determining the position vector for a plurality of reference points, relative to an origin, for example. A translation vector from each reference point to another can also be determined. In this way, a shape, such as that shown in FIG. 4B can be defined. In FIG. 4B a triangle has been chosen, however, a translation vector between two points (e.g., defining a line) or indeed any other shape is sufficient to carry out the disclosures herein. The shape of FIG. 4B will be used throughout the examples hereinafter and will be referred to as triangle ABC, or △ABC. It should be noted that △ABC has a fixed shape and is not distorted when translated, as it is mathematically described as, in the present example, 3 translation vectors between points A, B, and C; $\vec{AB}$, $\vec{BC}$, $\vec{CA}$.

Furthermore, a corresponding location of the reference markers is also made in a virtual space (referred to as the neospatial location), with temporary local coordinates, the local coordinate system having a known orientation with respect to the global coordinate system. Thus, the geospatial and neospatial location of the reference marker is known. Also known at the time of scanning (i.e., reading/interacting with/imaging) are the reference markers, which are the user device's position and orientation relative to the reference marker. Obtaining known physical dimensions and the appearance of the reference marker may comprise accessing a virtual space layer comprising the known physical dimensions and appearance of the reference object.

Measurements between the markers can be performed using an augmented reality measurement app (e.g., "AR ruler" by Auki Labs®) that utilizes, for example, the built-in SLAM functionality and accelerometers of the device to find the exact distance between the markers, with known orientation, the displacement between markers can then be obtained or calculated. Accordingly, each marker is given a 3D coordinate in a neospatial coordinate system temporarily created and stored on the device. The neospatial coordinate of each marker is exact, while the geospatial coordinates remain uncertain. Accordingly, the displacement between two or more markers, for example, A and B of FIG. 3, can be expressed as $\vec{AB}$.

The local coordinate system may be a coordinate system in a virtual space, i.e., the neospatial system, which may be part of a partially virtual world, such as an augmented reality world of known orientation. Alternatively, the virtual space may be part of a completely virtual world, such as a virtual reality world. The virtual space may have a coordinate system that is different to the preliminary coordinates of the first and second positional data. For example, the preliminary coordinates, being geospatial, are likely to be configured with the origin at the Earth's center, as is the case with GPS. The virtual space comprising the local coordinate system has a known orientation with respect to the global coordinate system.

Figure 5:
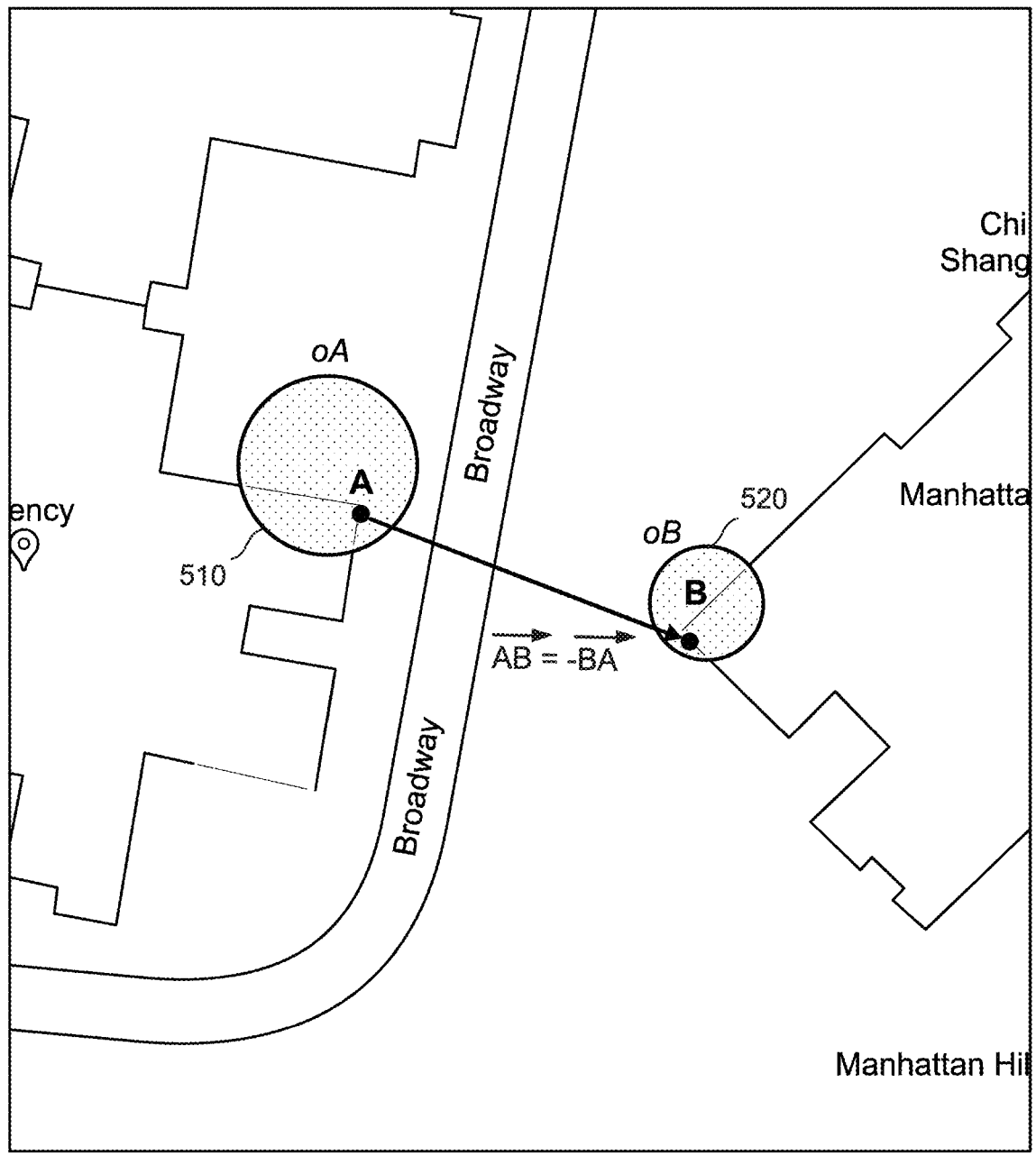
FIGS. 5 and 6 are illustrative diagrams showing the translation of error radii, in accordance with some embodiments of the disclosure.
Figure 6:
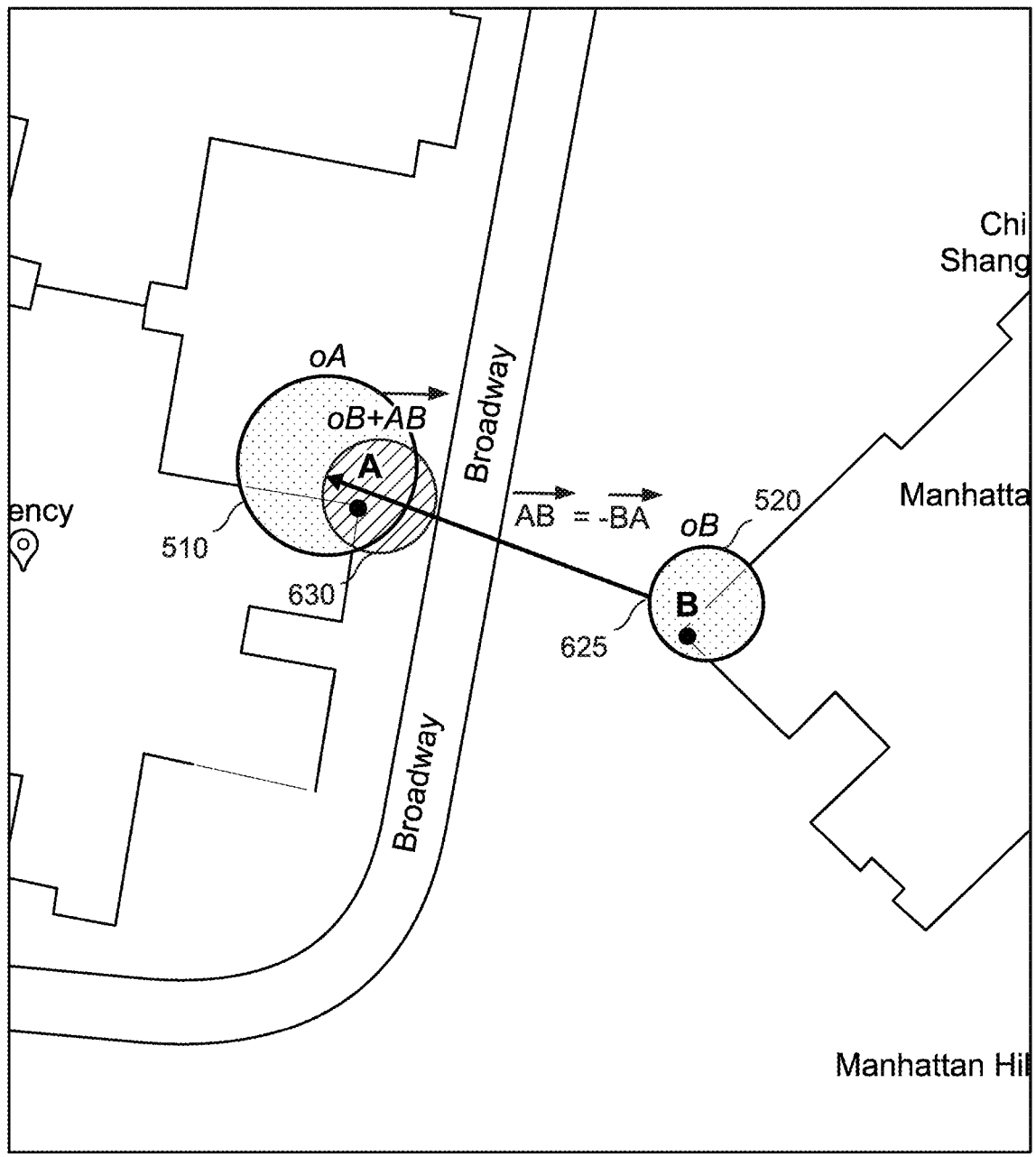

FIGS. 5 and 6 are illustrative diagrams showing the translation of error radii, in accordance with some embodiments of the disclosure. With regard to FIG. 5, the smallest error radii, in this case, the error radius area 520, oB, is selected to be translated towards reference marker A by $\vec{AB}$ or rather, to be more precise by $\vec{BA}$, however $\vec{AB}$ and $\vec{BA}$ are equal distance but have opposing directions, for simplicity $\vec{AB}$ shall continue to be used. For completeness, $\vec{AB}=-1*\vec{BA}$. FIG. 6 shows that the translation of error radius 520 by $\vec{AB}$ to error radius 510. In some examples, the translation of error area oB by $\vec{AB}$ is made from any coordinate 625 permitted within area oB.

In mathematics, the intersection of two or more sets is the set of elements that are common to each of the sets. An element is in the intersection if it belongs to all of the sets. The symbol for intersection is "∩", and is associated with the word "and," because A∩B is the set of elements that are in A and B simultaneously. To find the intersection of two (or more) sets, only those elements that are listed in both (or all) of the sets. In a Venn Diagram, the intersection of two sets A and B can be shown at the shaded region in the middle of two interlocking circles, in a similar way, the intersection between oA and oB is also the middle of the two interlocking regions. In mathematical notation, the intersection of A and B is written as A∩B={x:x∈A and x∈B}.

In FIG. 6, for example, we find that by moving the configuration to the leftmost possible coordinate allowed by the uncertainty oB, we can deduce that marker A could not possibly be further left, as assuming a coordinate further left while maintaining neospatial coherence would leave marker B outside of the acceptable geospatial range provided by the GPS. In particular, it is shown that oB can be translated by vector $\vec{AB}$, and that the geospatial coordinate of marker A must be within the intersection of oA and the translated oB, oB+$\vec{AB}$, wherein + is used to represent a translation of oB by $\vec{AB}$.

In the example of FIGS. 2, 3, 5, and 6 only two markers are shown and a translation vector. However, it should be understood that a plurality of markers can be used and the term translation vector is sometimes used herein as a label to describe not only a translation in an x, y, and/or z-direction of the second error radius but also an accompanying rotation and/or an additional rotational vector. In particular, as the user scans the two or more reference markers the translation vector may comprise a series of translations and rotations similar to the path the user's device took in the local coordinate system, between the two reference markers. However, in some examples, a shortest path translation can be calculated between the two or more reference markers, irrespective of the path the user's device took in the local coordinate system.

In another use case, if a user was communicating with a plurality of beacons in a location, wherein the exact location of the beacons was known to the user device, a relative location of the user device to the beacons can be determined, the uncertainty radius reduced, and then a real location of the user device determined. Put another way, if a user device communicates with a plurality of beacons, it will be able to determine a direction, distance, and radius of uncertainty for each beacon, which can be minimized by the methods herein. Knowing the real location of the beacons, and the relative location of the user device, a real location of the user device can be determined. The beacons may be, for example, UWB beacons, Wi-Fi mesh beacons, or the like, within a user's home, an office space, train station, bus station, stadium, or the like.

In addition, the imaging of reference markers may be dependent on the respective field of view of the user device. In some examples, after observing a reference marker in the field of view of the user device, a current location will be requested (e.g., via GPS or the like) and a SLAM algorithm, mapping the area until the next reference marker, is utilized. The next reference marker may be located behind the user, with respect to the user's initial field of view. Therefore, when applying a translation vector, a rotational vector may be required. In addition, in another example, the user may be able to record one or more reference markers by rotating their field of view and not moving the user device. Therefore, in some scenarios, the translation vector is also likely to comprise a rotational element or rotational vector. In some examples, the translation vector and rotational vector are applied separately or in parallel to arrive at a combined translation vector.

For completeness, in mathematics, the axis-angle representation of a rotation parameterizes a rotation in a three-dimensional Euclidean space by two quantities: a unit vector e indicating the direction of an axis of rotation, and an angle θ describing the magnitude of the rotation about the axis. In the present examples, the unit vector e, the axis of rotation, will be parallel to the conventional z-direction (e.g., upwards), which is typically substantially perpendicular to the field of view of the user, or the user's device. However, other axes of rotations may be selected, for example, the axis of rotation may be parallel to the translation vector. In this way, a rotational vector can be applied directly to the translation vector to result in a single vector.

Only two numbers, not three, are needed to define the direction of a unit vector e rooted at the origin because the magnitude of e is constrained. For example, the elevation and azimuth angles of e suffice to locate it in any particular Cartesian coordinate frame. The angle and axis determine a transformation that rotates three-dimensional vectors (e.g., positional vectors of the first and second users). The axis-angle representation is equivalent to the more concise rotation vector, also called the Euler vector. In this case, both the rotation axis and the angle are represented by a vector codirectional with the rotation axis whose length is the rotation angle θ, $$\vec{\theta} = \theta e$$

Many rotation vectors correspond to the same rotation. In particular, a rotation vector of length θ+2πM, for any integer M, encodes the same rotation as a rotation vector of length θ. Thus, there is at least a countable infinity of rotation vectors corresponding to any rotation. Furthermore, all rotations by 2πM are the same as no rotation at all, so, for a given integer M, all rotation vectors of length 2πM, in all directions, constitute a two-parameter uncountable infinity of rotation vectors encoding the same rotation as the zero vector. These relationships are taken into account when inverting the exponential map, that is when finding a rotation vector that corresponds to a given rotation matrix if applying the present disclosure with matrices rather than vectors.

Figure 7:
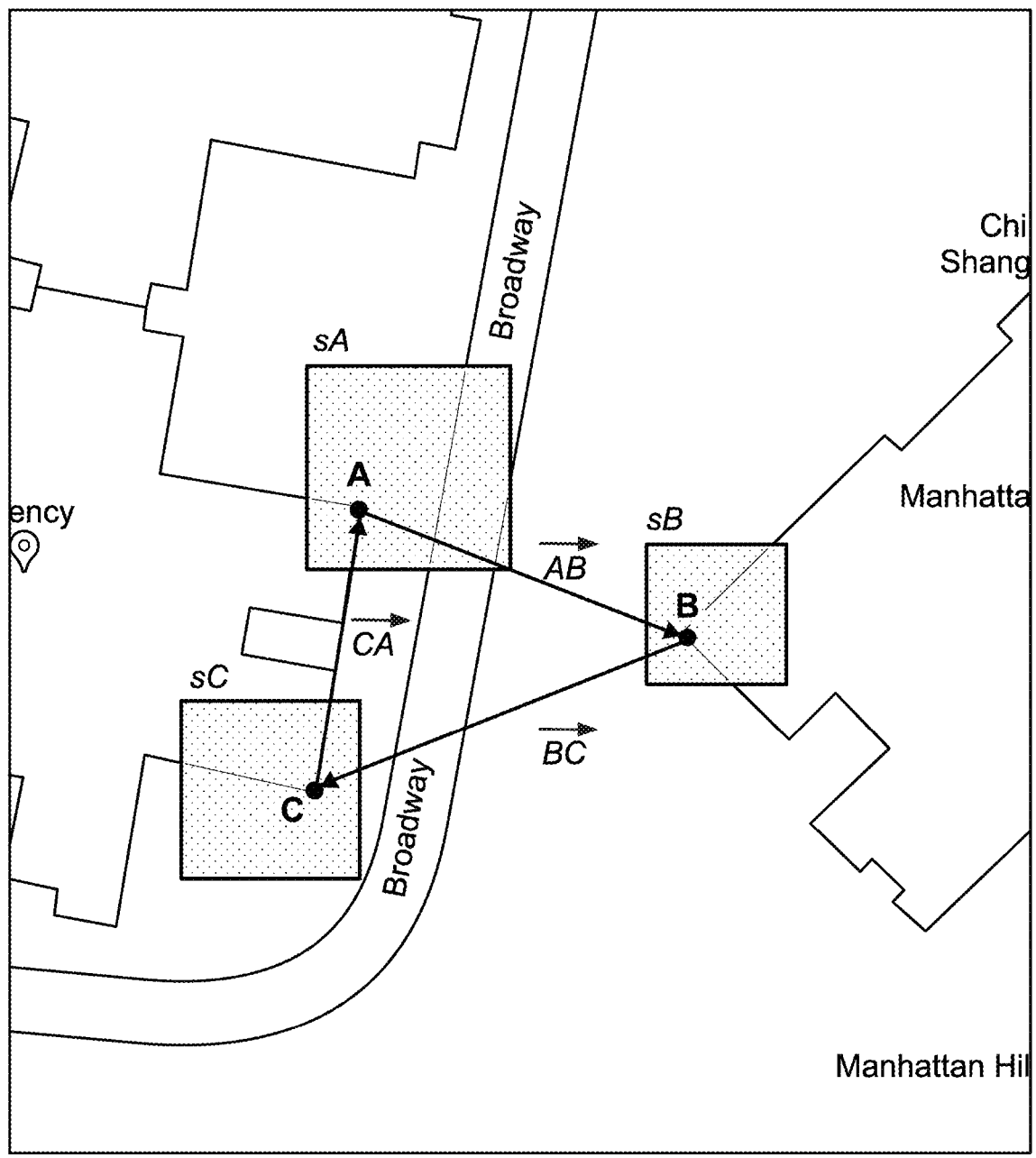
FIGS. 7 to 12 are exemplary diagrams of determining error radii, translating error radii and iterating the progress to arrive at a minimized geospatial uncertainty, in accordance with some embodiments of the disclosure.

FIGS. 7 to 12 are exemplary diagrams of determining error radii, translating error radii and iterating the progress to arrive at a minimized geospatial uncertainty, in accordance with some embodiments of the disclosure. FIGS. 7 to 12 have error radii that are shown as rectangles for simplicity. With reference to FIG. 7, three squares (sA, sB, sC), represent three error radii about reference markers A, B, and C, respectively. In addition, the neospatial relationships, and thus the displacement between points A, B, and C have already been measured and are demonstrated in FIGS. 7 to 12 by ΔABC. In particular ΔABC comprises three translation vectors $\vec{AB}$, $\vec{BC}$, $\vec{AC}$ which respectively describe the displacement between each of the reference markers A, B, and C.

Figure 8:
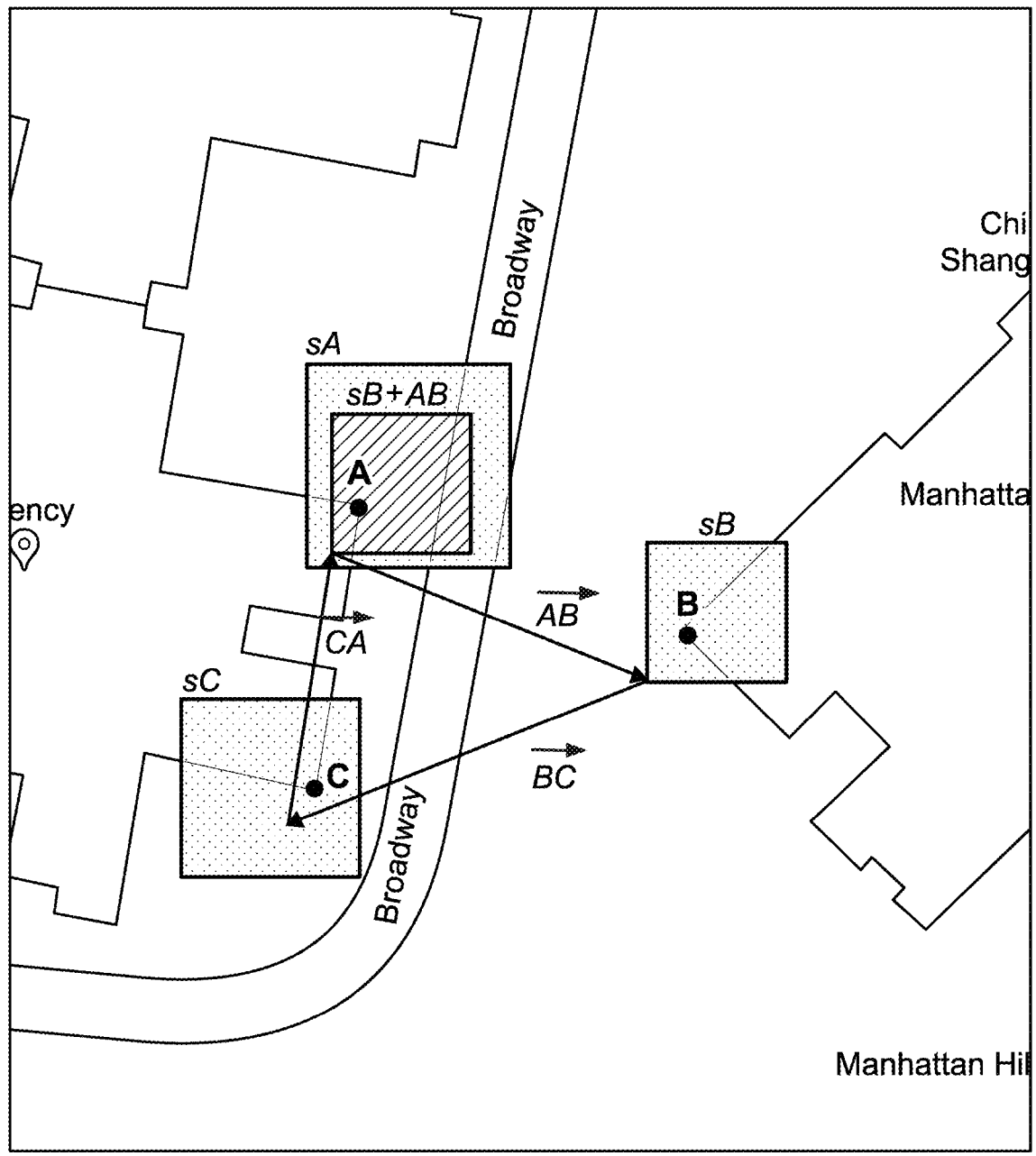

With regard to FIG. 8, in the first instance error square sB is the smallest of the error squares, so is chosen to be translated first. The leftmost corner coordinate of sB is selected to be the translation start point, as this is the closest to sA. By translating error square sB by $\vec{AB}$, it can be deduced that marker A must exist within the intersection of sA and [sB+AB]. That is to say that, marker A must exist within sA∩[sB+AB]. Accordingly, the error square sA can be reduced to the size of sA∩[sB+AB], sA is now updated to be the intersection of sA∩[sB+AB].

Figure 9:
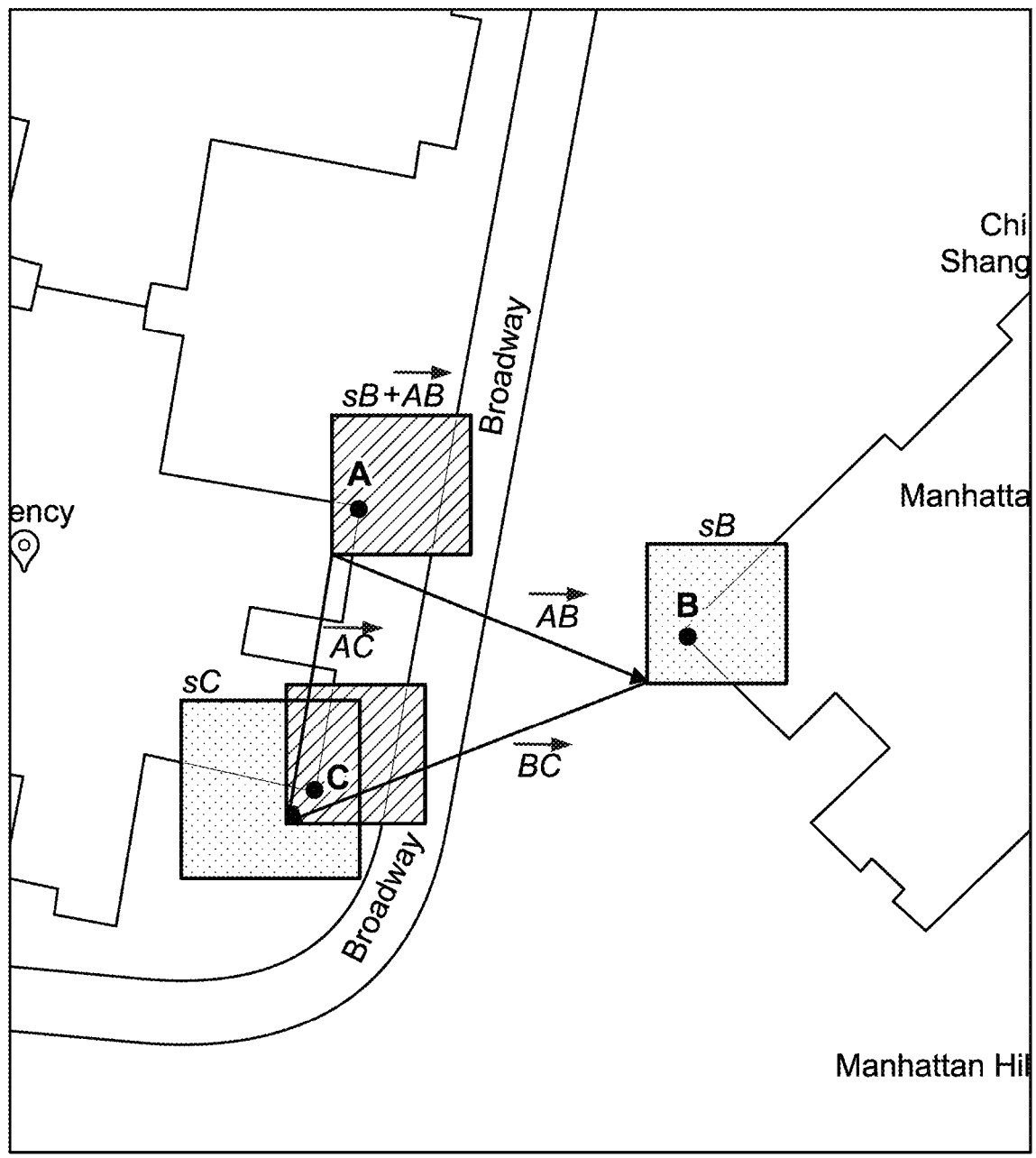

With regard to FIG. 9, the next iteration begins. In this example, sB is translated by $\vec{BC}$, it can be deduced that marker C must exist within the intersection of sC and [sB+BC]. That is to say, marker C must exist within sC∩[sB+BC]. Accordingly, the error square sC can be reduced to the size of sC∩[sB+BC], sC is now updated to be the intersection of sA∩[sB+BC]. The iterative steps are described with reference to FIGS. 8 and 9 may be performed in sequence or parallel. In particular, the system may determine that, as error square sB is the smallest out of the three error squares, that error square sB can be translated to all other points in parallel and the intersection of sB and the other error squares can be recorded.

Figure 10:
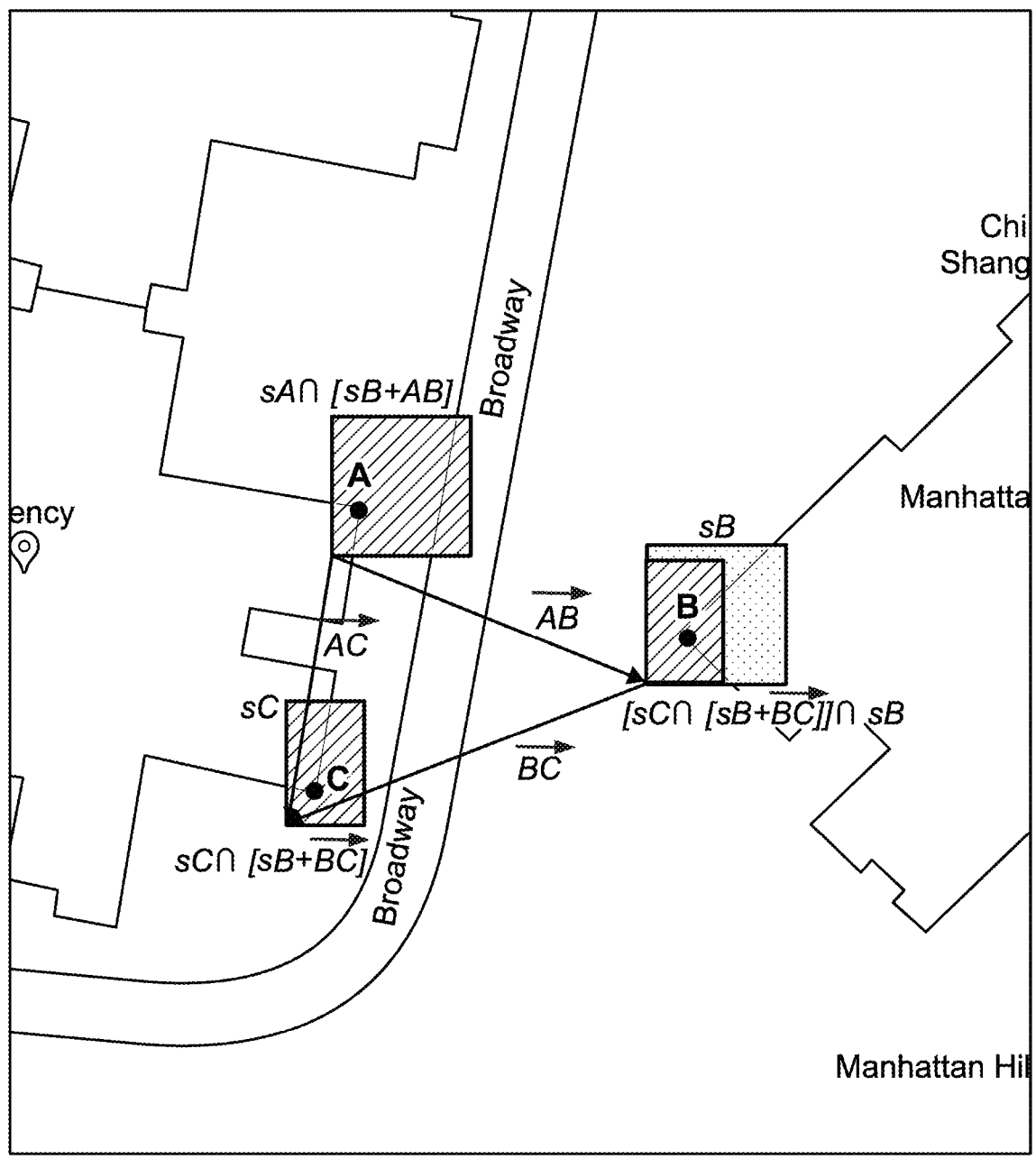
Figure 11:
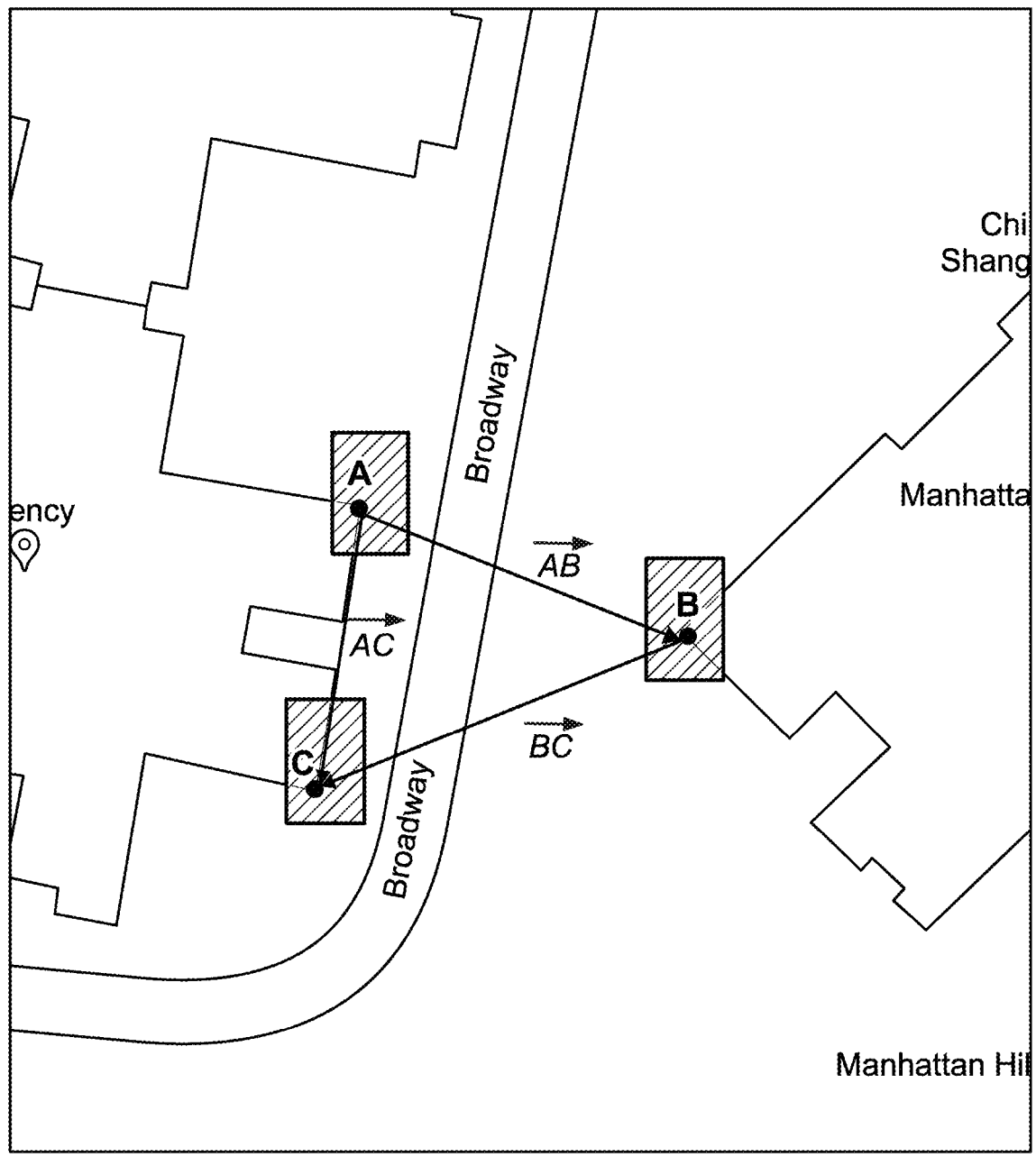

With regard to FIG. 10, the intersection of sC and sB has now become the smallest error square. Accordingly, the next step in the iterative process would be to translate the now reduced error square sC by $\vec{BC}$ and/or $\vec{AC}$. In this way, the original error square sB is also reduced; meaning that the error uncertainty of all three reference markers has now been reduced. Marker A is located within sA∩[sB+AB], Marker C is located within sC∩[sB+BC], Marker is located within [sC∩[sB+BC]]∩sB, and so on. By continuously iterating (moving the smallest derived uncertainty error by the neospatial reference displacement of the reference markers) in this way, drastically reduces the uncertainty of geospatial location measurements, and can let uncertainty areas be equal to, or less than, the area to the smallest uncertainty area generated in the first instance, by translating and reducing to the size of the intersection. For example, with regard to FIG. 11, carrying out the process again, this time translating the updated error square sC (that is [sC∩[sB+BC]) by AC, the once reduced error square sA is reduced further.

Figure 12:
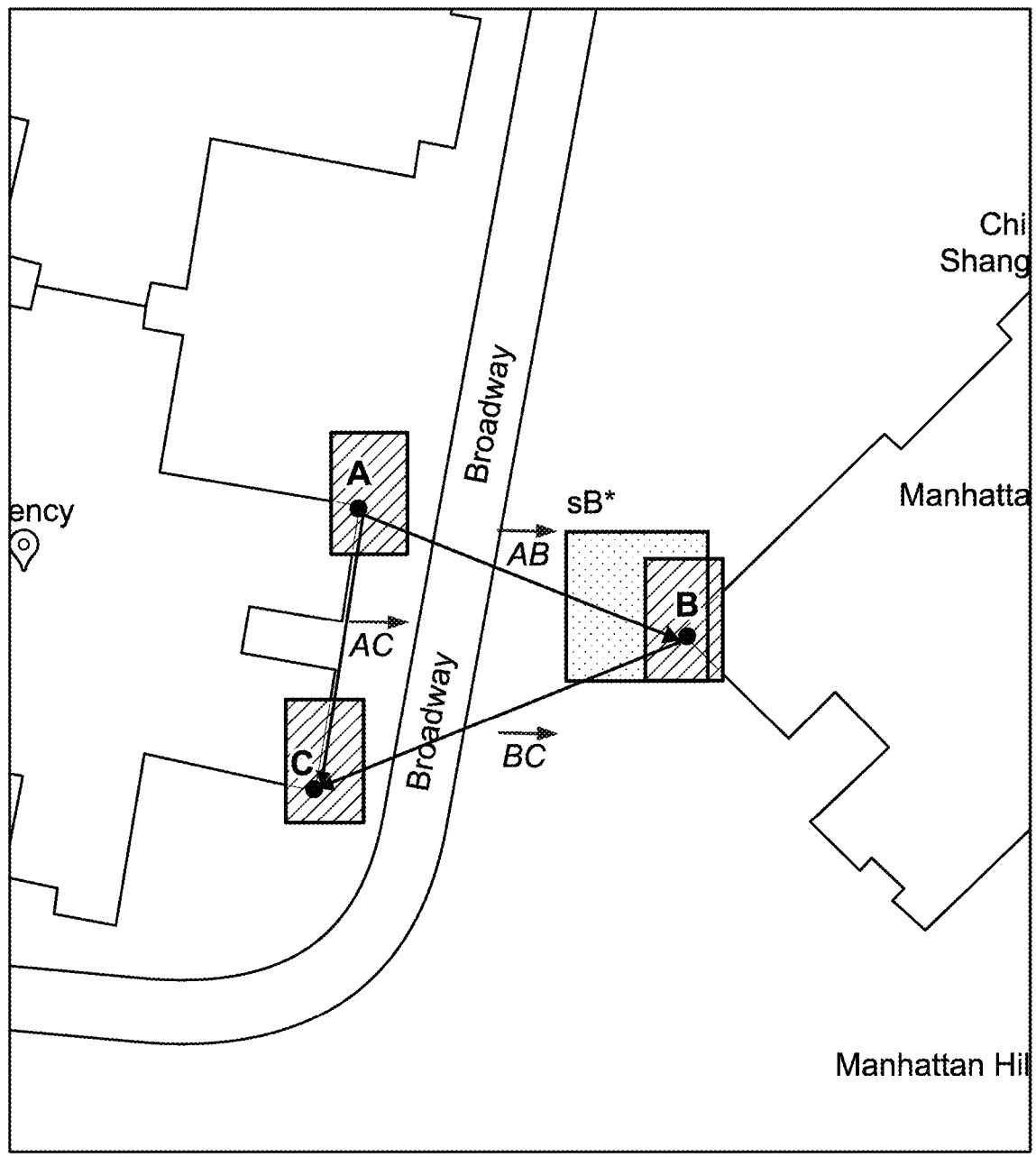

FIG. 12 demonstrates that subsequent measurements, by the user device, of the reference marker again, for example, reference marker B, a further geospatial uncertainty can be introduced, enabling the iterative process to be carried out again as the new error square sB* has an intersection with the updated error square about reference marker B that further reduces the uncertainty, and so on. In this way, the iterative process can continue until the process reaches a threshold. In some examples, the threshold may be based on an ideal uncertainty radius size, after a total number of iterations, after the expiration of a timer, and/or when the resolution of the uncertainty (e.g., the uncertainty radius) is the same order of magnitude as the user device. For example, the iterative process may be halted when the radii of uncertainty of each reference marker are less than a specific size, such as below 10 mm; after a number of iterations, such as 100 iterations; after iterating for a period of time, such as 5 seconds; or when the size of one or more error the size of the user device. It should be understood that these examples are given for illustration of the configuration of the threshold of the iterative process.

Figure 13:
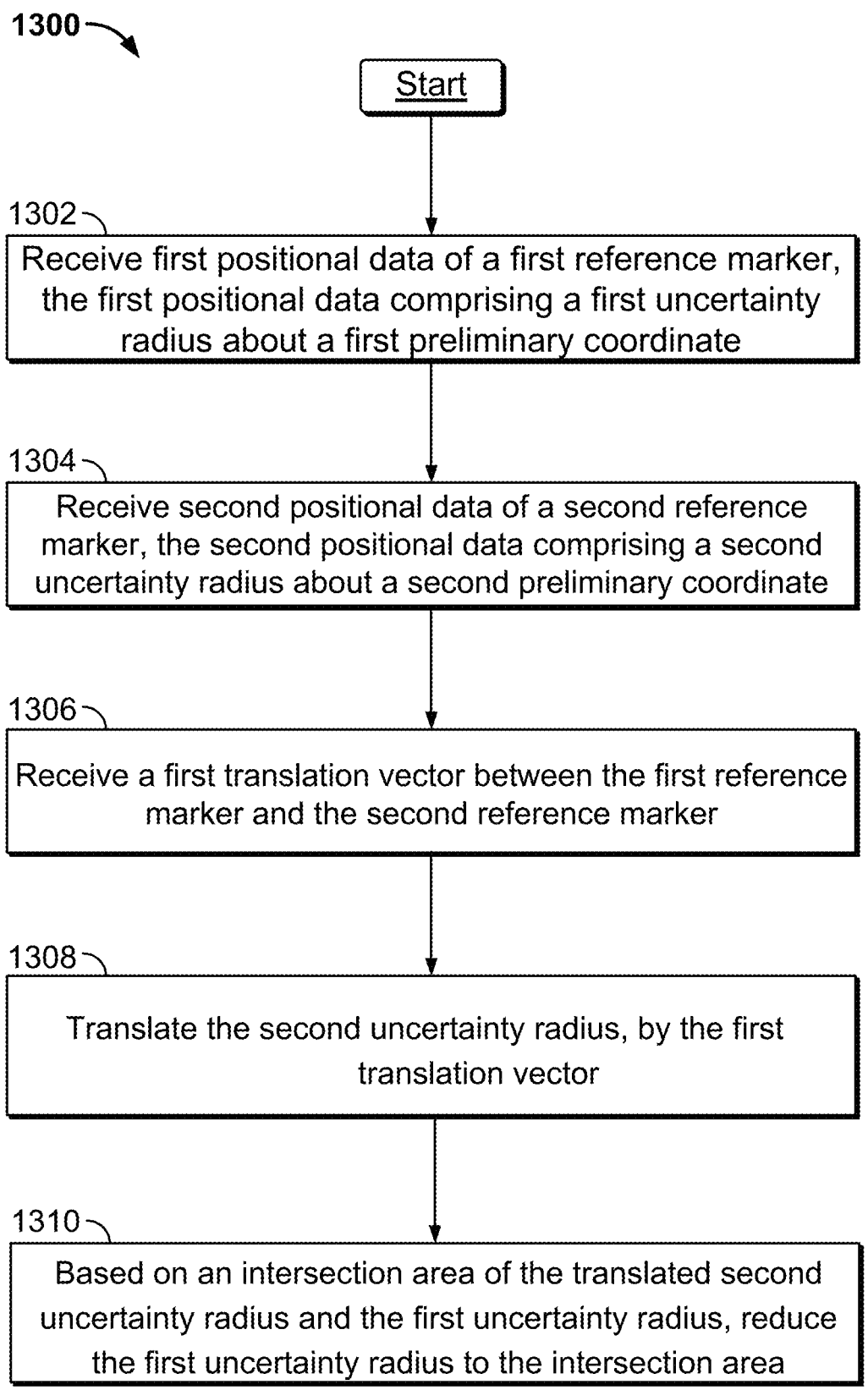
FIG. 13 is an illustrative flowchart of a process for minimizing geospatial uncertainty of a location, in accordance with some embodiments of the disclosure.

FIG. 13 is an illustrative flowchart of a process for minimizing geospatial uncertainty of a location, in accordance with some embodiments of the disclosure. It should be noted that process 1300 or any step thereof could be performed on, or provided by, any of the devices shown in FIGS. 14 and 15, below. In addition, one or more steps of process 1300 may be incorporated into or combined with one or more steps of any other process or embodiment described herein.

At step 1302, the system receives first positional data of a first reference marker, the first positional data comprising a first uncertainty radius about a first preliminary coordinate. At step 1304, the system receives second positional data of a second reference marker, the second positional data comprising a second uncertainty radius about a second preliminary coordinate. The receiving may be carried out by a transceiver, such as that described with reference to FIG. 15.

At step 1306, the system receives a first translation vector between the first reference marker and the second reference marker. In some examples, the first translation vector comprises the displacement from the second reference marker to the first reference marker, alternatively, the first translation vector may comprise the displacement from the first reference marker to the second reference marker. In some examples, the translation vector may be calculated, that is to say, that the translation vector may have already been received and step 1306 is replaced by a step wherein the system calculates a first translation vector to the first reference marker from the second reference marker, or vice versa. For example, relative to an origin point (e.g., origin 400 of FIG. 4), the location and distance of the reference markers are determined. In practice, this is carried out by determining the coordinates of the reference marker relative to the origin, for example, the Earth's center at $(x_1, y_1, z_1)$, the positional vector is therefore the $\vec{OA} = x_1 \hat{i} + y_1 \hat{j} + z_1 \hat{k}$, where $\hat{i}$, $\hat{j}$, and $\hat{k}$ are orthogonal unit vectors; the same can be done for each reference marker. After, a translation vector between each reference marker is calculated. In practice, this is carried out by determining the coordinates of the reference marker relative to the origin, for example, if reference marker A is at $(x_1, y_1, z_1)$ and reference marker B is at $(x_2, y_2, z_2)$. The translation vector from reference marker B to reference marker A is therefore $\vec{BA} = (x_2-x_1)\hat{i} + (y_2-y_1)\hat{j} + (z_2-z_1)\hat{k}$, where $\hat{i}$, $\hat{j}$, and $\hat{k}$ are orthogonal unit vectors; the same can be done to determine the translation vector between each reference marker, mutatis mutandis.

At step 1308, the system translates the second uncertainty radius, by the first translation vector, as described in detail with reference to FIGS. 5 to 12. For example, the first and second positional data may comprise information such as a direction, distance, elevation, or other information describing a particular location of the imaged (or scanned/measured etc.) reference marker relative to the user's current position and/or field of view. Using the translation vector, the positional information may be corrected so that the direction, distance, elevation, or other information instead describes the true location to be used in the local coordinate system.

At step 1310, based on an intersection area of the translated second uncertainty radius and the first uncertainty radius, the system reduces the first uncertainty radius to the intersection area.

Process 1300 may also comprise optional steps (not shown). Such as initiating a repeat loop between steps 1308 and 1310. In addition, process 1300 may also comprise a break to the loop between steps 1308 and 1310, after a condition is met, such as the threshold as discussed with reference to FIG. 12. Moreover, process 1300 may also comprise a waiting period (not shown) in between steps 1304 and 1306, to allow the user enough time to scan a plurality of reference markers. The waiting period may comprise a manual action button to force process 1300 to proceed to step 1306.

Figure 14:
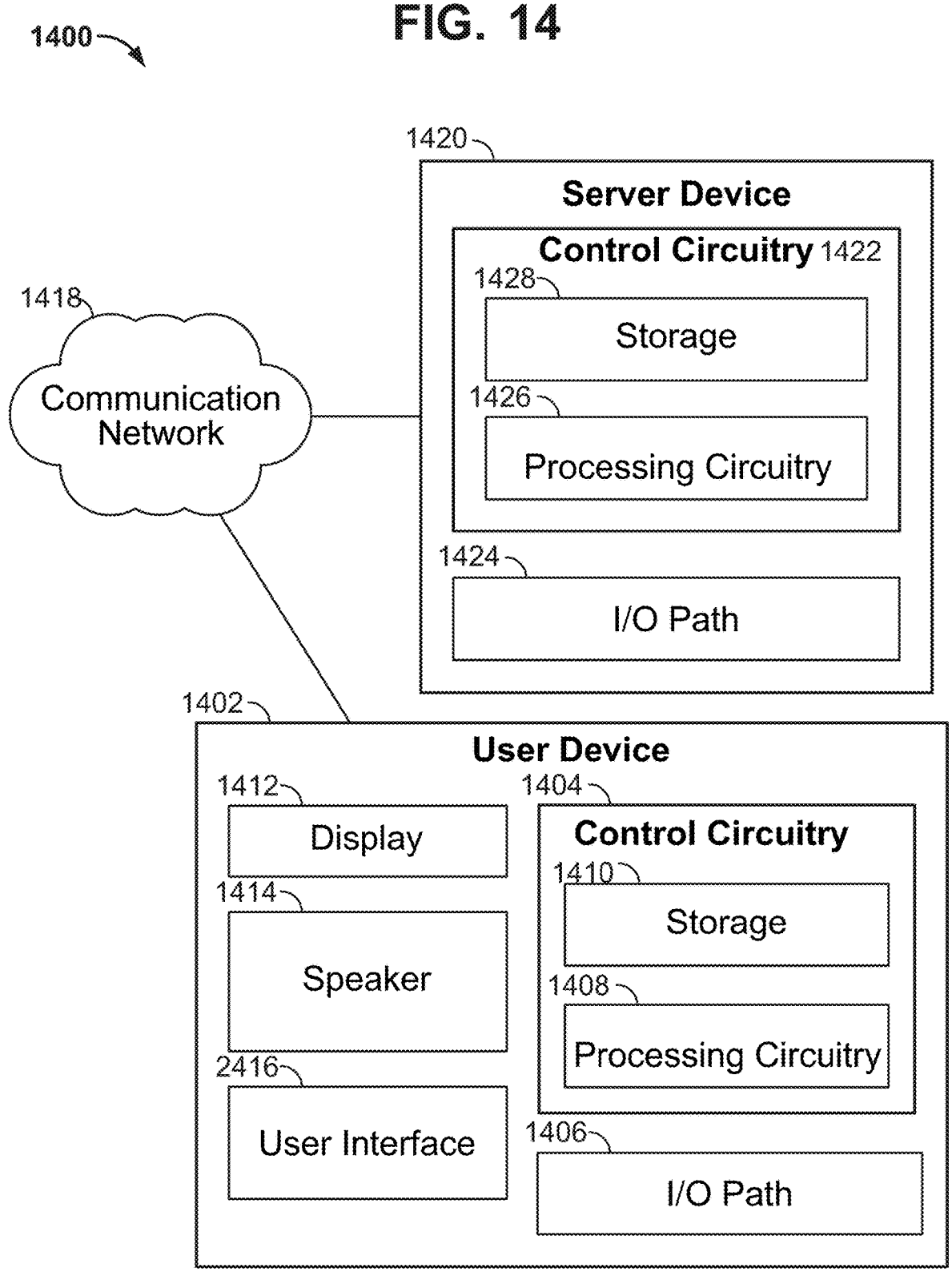
FIG. 14 is an illustrative topology of equipment (or computing configuration) programmed and configured for navigating media content, according to some examples of the disclosure.

FIG. 14 shows an illustrative block diagram of a computing configuration 1400 that may include the media apparatus, system, and/or methods disclosed herein. Computing configuration 1400 includes a user device 1402. The user device 1402 may be a portable electronic device, such as a smartphone, a tablet, a laptop, a smartwatch, smart glasses, augmented reality (AR) glasses, AR lenses or any other suitable device. In some embodiments, the user device 1402 may include control circuitry 1404 and an input/output (I/O) path 1406. Control circuitry 1404 may include processing circuitry 1408, and storage 1410 (e.g., RAM, ROM, hard disk, a removable disk, etc.), the storage 1410 may comprise the instructions for carrying out the methods herein, such as process 1300. In addition, storage 1410 may temporarily store the local coordinate system for carrying out the measurements between two or more reference markers. For example, the reference markers may be converted into a position in the local coordinate system and a SLAM algorithm on the user device is used to measure a displacement between the reference markers. I/O path 1406 may provide device information, or other data, over a local area network (LAN) or wide area network (WAN), and/or other content and data to control circuitry 1404. Control circuitry 1404 may be used to send and receive commands, requests, signals (digital and analog), and other suitable data using I/O path 1406. I/O path 1406 may connect control circuitry 1404 (and specifically processing circuitry 1408) to one or more communications paths.

User device 1402 may include a head-up display 1412 and a speaker 1414 to display content visually and audibly. In addition, to interact with a user, user device 1402 includes a user interface 1416. The user interface 1416 may include a scroll wheel, a physical button, a switch, a touchpad, a direct-drive motor, a trigger, or a touchscreen. The user interface 1416 is connected to the I/O path 1406 and the control circuitry 1404.

Control circuitry 1404 may be based on any suitable processing circuitry such as processing circuitry 1408. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores), a cloud based compute unit, or even a supercomputer. In some examples, processing circuitry may be distributed across multiple separate processors or processing units, for example, multiple of the same type of processing units (e.g., two Intel Core i7 processors) or multiple different processors (e.g., an Intel Core i5 processor and an Intel Core i9 processor).

A memory may be an electronic storage device provided as storage 1410, which is part of control circuitry 1404. Storage 1410 may store instructions that, when executed by processing circuitry 1408, perform the processes described herein. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Nonvolatile memory may also be used (e.g., to launch a boot-up routine and other instructions). The user device 1402 may be a smartphone, a tablet, an e-reader, a laptop, etc., comprising a camera (not shown) to record images of the reference markers.

Computing configuration 1400 may also include a communication network 1418 and a server device 1420. The user device 1402 may be coupled to the communication network 1418 to communicate with the server device 1420. The communication network 1418 may be one or more networks including the Internet, a mobile phone network, mobile voice or data network (e.g., a BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols), mesh network, peer-to-peer network, cable network, or other types of communication network or combinations of communication networks. In addition, a further user device (not shown) may also be in communication with communication network 1418.

In some examples, server device 1420 may include control circuitry 1422 and an input/output (I/O) path 1424. Control circuitry 1404 may include processing circuitry 1426, and storage 1428, which may similar to those already discussed in relation to the user device 1402. Server device 1420 may be a content provider for the user device 1402, such as SLAM algorithm data, neospatial data information, geospatial data information, user profile data, or the like.

It is understood that user device 1402 is not limited to the embodiments and methods shown and described herein. In non-limiting examples, the user device 1402 may be, a digital storage device, a digital media receiver, a digital media adapter, a streaming media device, a personal computer (PC), a laptop computer, a tablet computer, a PC media server, a PC media centre, a handheld computer, a personal digital assistant (PDA), a mobile telephone, a portable gaming machine, a smartphone, a virtual reality headset, an augmented reality headset, a mixed reality headset, or any other device, client equipment, or wireless device, and/or combination of the same capable of carrying out the methods as described with reference to the claims.

Figure 15:
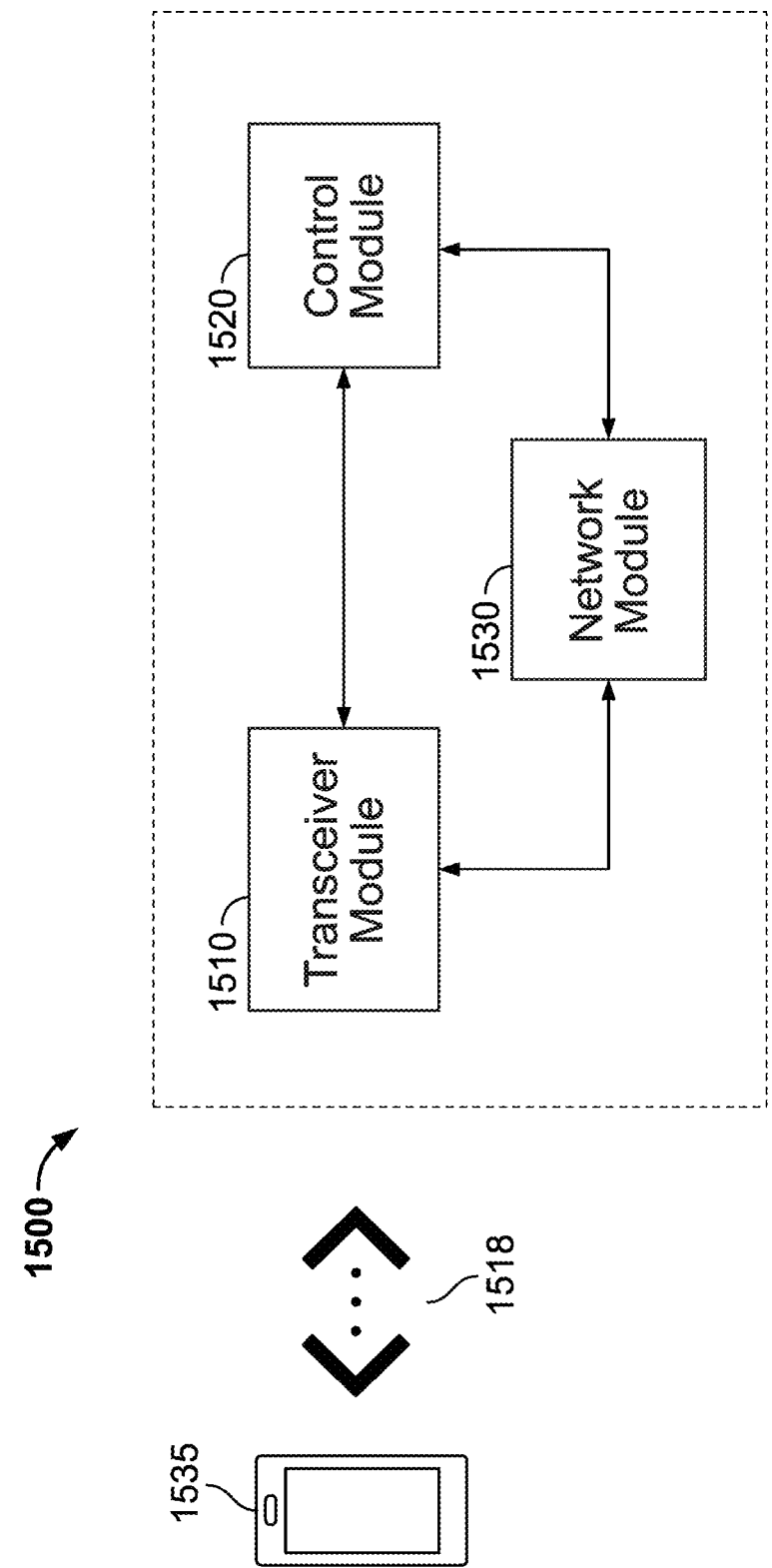
FIG. 15 illustrates an exemplary head-up display apparatus, in accordance with some examples of the disclosure.

FIG. 15 illustrates an exemplary media device 1500, in accordance with some embodiments of the disclosure. The media device 1500 comprises a transceiver module 1510, a control module 1520, and a network module 5130. The media transmission system may communicate with an additional user device 1535, such as a gateway, smartphone, camera system (e.g., 3D camera), Internet of Things (IoT) device, or other device, as described with reference to FIG. 14. In some examples, the additional user device 1535 is the user's main device for interacting with the reference markers, and the media device 1500 comprises the components for carrying out the processing, in particular when the additional user device is limited in processing capabilities.

In some examples, the transceiver module communicates with a second user device 1535 via communication link 1518. The communication link 1518 between the transceiver module 1510 and the second user device 1535 may comprise a physical connection, facilitated by an input port such as a 3.5 mm jack, RCA jack, USB port, ethernet port, or any other suitable connection for communicating over a wired connection or may comprise a wireless connection via BLUETOOTH, Wi-Fi, WiMAX, Zigbee, GSM, UTMS, CDMA, TDMA, 3G, 4G, 4G LTE, 5G or other wireless transmissions as described by the relevant 802.11 wireless communication protocols.

In some examples, second user device 1535 may receive image data inputs (e.g., images of a QR code, representing reference markers as described above) and then transmit the image data to the media device 1500. However, these examples are considered to be non-limiting and other combinations of the features herein being spread over two or more devices are considered within the scope of this disclosure. For example, each of the transceiver module, the network module, and the control module may be separate internet of things (IoT) devices that each carry out a portion of the methods herein. Collectively, these devices may be referred to as a system. In some examples, the image data may be stored on a server such as server device 1420 of FIG. 14.

The media device 1500 and/or user device 1535 system may collective be a series of image capturing devices in operation on a portable backpack, vehicle (e.g., a car or van), a bicycle, or the like. Further, the media device 1500 may be a virtual reality, mixed reality, or augmented reality headset and, in such an instance, may comprise an eye contact detection component, which may be a part of control module 1520, may be used to identify the gaze point of a user, in order to determine whether or not a user is focusing on a particular portion of the environment and/or determine a line of sight or field of view a user. For example, the location upon which a user's eyes are focused may determine where image data is captured and recorded.

In particular, the transceiver module 1510 and network module 1530 may be configured to receive first positional data of a first reference marker, the first positional data comprising a first uncertainty radius about a first preliminary coordinate, and receive second positional data of a second reference marker, the second positional data comprising a second uncertainty radius about a second preliminary coordinate. Moreover, the control module 1520 may be configured to calculate a first translation vector between a first reference marker and a second reference marker; translate the second uncertainty radius, by the first translation vector, to the first preliminary coordinate; and, based on an intersection area of the translated second uncertainty radius and the first uncertainty radius, reduce the first uncertainty radius to the intersection area.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment appropriately, done in different orders, or done in parallel. In addition, the systems and methods described herein may be performed in real-time. It should also be noted that the systems and/or methods described above may be applied to, or used in accordance with, other systems and/or methods. In this specification, the following terms may be understood given the below explanations:

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for minimizing uncertainty in a location measurement, the method comprising:
    scanning, with a user device, a first reference marker to receive first positional data of the first reference marker, the first positional data comprising a first uncertainty radius about a first preliminary coordinate, wherein the first uncertainty radius is based on a first resolution of the uncertainty of the first positional data;
    scanning, with the user device, a second reference marker to receive second positional data of the second reference marker, the second positional data comprising a second uncertainty radius about a second preliminary coordinate, wherein the second uncertainty radius is based on a second resolution of the uncertainty of the second positional data;
    calculating a first translation vector comprising the displacement to the first reference marker from the second reference marker;
    determining, based on the first uncertainty radius, a first error area;
    determining, based on the second uncertainty radius, a second error area;
    translating, from a point within the second error area, the second error area, by the first translation vector;
    determining an intersection area of the translated second error area and the first error area; and
    reducing the first error area to the intersection area.

2. The method of claim 1, further comprising iteratively repeating the translation and reduction of the error area.

3. The method of claim 2, further comprising halting the iterative process when the first error area reaches a threshold.

4. The method of claim 3, wherein the threshold is based on an ideal error area size, a total number of iterations, an expiration of a timer, and/or when the resolution of the uncertainty is the same order of magnitude as the user device.

5. The method of claim 1, wherein scanning the first and second reference markers further comprises capturing, by a camera of the user device, the first and second reference markers, and the method further comprises storing the first positional data and second positional data in a temporary local coordinate system stored on the user device.

6. The method of claim 5, further comprising performing, on the user device, a simultaneous learning and mapping (SLAM) algorithm to obtain a displacement between the first and second marker in the local coordinate system.

7. The method of claim 1, further comprising:
    scanning, with the user device, a third reference marker to receive third positional data of the third reference marker, the third positional data comprising a third uncertainty radius about a third preliminary coordinate, wherein the third uncertainty radius is based on a third resolution of the uncertainty of the third positional data;
    calculating a second translation vector comprising the displacement from the first reference marker to the third reference marker;
    determining, based on the third uncertainty radius, a third error area;
    translating, from a point within the third error area, the reduced first error area, by the second translation vector; and
    determining an intersection area of the translated reduced first error area and the third error area, reducing the third error area to the intersection area.

8. The method of claim 7, wherein scanning the first and second reference markers further comprises capturing, on a camera of the user device, the first and third reference markers, and the method further comprises:
    storing the first positional data and third positional data into a temporary local coordinate system stored on the user device; and
    performing, on the user device, a simultaneous learning and mapping (SLAM) algorithm to obtain an absolute distance between the first and third marker in the local coordinate system.

9. The method of claim 8, wherein the user device is a second user device, different to the first user device.

10. A non-transitory computer-readable medium, having instructions recorded thereon which, when executed, carry out a method for minimizing uncertainty in a location measurement, the method comprising:
    scanning, with a user device, a first reference marker to receive first positional data of the first reference marker, the first positional data comprising a first uncertainty radius about a first preliminary coordinate, wherein the first uncertainty radius is based on a first resolution of the uncertainty of the first positional data;

scanning, with the user device, a second reference marker to receive second positional data of the second reference marker, the second positional data comprising a second uncertainty radius about a second preliminary coordinate, wherein the second uncertainty radius is based on a second resolution of the uncertainty of the second positional data;

calculating a first translation vector comprising the displacement to the first reference marker from the second reference marker;

determining, based on the first uncertainty radius, a first error area;

determining, based on the second uncertainty radius, a second error area;

translating, from a point within the second error area, the second error area, by the first translation vector;

determining an intersection area of the translated second error area and the first error area; and reducing the first error area to the intersection area.

11. The computer-readable medium of claim 10, further comprising iteratively repeating the translation and reduction of the error area.

12. The computer-readable medium of claim 11, further comprising halting the iterative process when the first error area reaches a threshold.

13. The computer-readable medium of claim 12, wherein the threshold is based on an ideal error area size, a total number of iterations, an expiration of a timer, and/or when the resolution of the uncertainty is the same order of magnitude as the user device.

14. The computer-readable medium of claim 10, wherein scanning the first and second reference markers further comprises capturing, by a camera of the user device, the first and second reference markers, and the method further comprises storing the first positional data and second positional data in a temporary local coordinate system stored on the user device.

15. The computer-readable medium of claim 14, further comprising performing, on the user device, a simultaneous learning and mapping (SLAM) algorithm to obtain a displacement between the first and second marker in the local coordinate system.

16. The computer-readable medium of claim 10, further comprising:

scanning, with the user device, a third reference marker to receive third positional data of the third reference marker, the third positional data comprising a third uncertainty radius about a third preliminary coordinate, wherein the third uncertainty radius is based on a third resolution of the uncertainty of the third positional data;

calculating a second translation vector comprising the displacement from the first reference marker to the third reference marker;

determining, based on the third uncertainty radius, a third error area;

translating, from a point within the third error area, the reduced first error area, by the second translation vector; and determining an intersection area of the translated reduced first error area and the third error area, reducing the third error area to the intersection area.

17. The computer-readable medium of claim 16, wherein scanning the first and second reference markers further comprises capturing, by a camera of the user device, the first and third reference markers, and the method further comprises:

storing the first positional data and third positional data into a temporary local coordinate system stored on the user device; and performing, on the user device, a simultaneous learning and mapping (SLAM) algorithm to obtain a displacement between the first and third marker in the local coordinate system.

18. The computer-readable medium of claim 17, wherein the user device is a second user device, different to the first user device.

19. A media device comprising a control module, a transceiver module and a network module for minimizing uncertainty in a location measurement, configured to:

scan, with the media device, a first reference marker to receive first positional data of the first reference marker, the first positional data comprising a first uncertainty radius about a first preliminary coordinate, wherein the first uncertainty radius is based on a first resolution of the uncertainty of the first positional data;

scan, with the media device, a second reference marker to receive-second positional data of the second reference marker, the second positional data comprising a second uncertainty radius about a second preliminary coordinate, wherein the second uncertainty radius is based on a second resolution of the uncertainty of the second positional data;

calculate a first translation vector comprising the displacement to the first reference marker from the second reference marker;

determine, based on the first uncertainty radius, a first error area;

determine, based on the second uncertainty radius, a second error area;

translate, from a point within the second error area, the second error area, by the first translation vector;

determine an intersection area of the translated second error area and the first error area; and reduce the first error area to the intersection area.

20. The media device of claim 19, further configured to iteratively repeat the translation and reduction of the error area.

21. The media device of claim 20, further configured to halt the iterative process when the first error area reaches a threshold.

22. The media device of claim 21, wherein the threshold is based on an ideal error area size, a total number of iterations, an expiration of a timer, and/or when the resolution of the uncertainty is the same order of magnitude as the media device.

23. The media device of claim 19, wherein scanning the first and second reference markers further comprises capturing, by a camera of the media device, the first and second reference markers, and the media device is further configured to store the first positional data and second positional data in a temporary local coordinate system stored on the media device.

24. The media device of claim 23, further configured to perform, on the media device, a simultaneous learning and mapping (SLAM) algorithm to obtain a displacement between the first and second marker in the local coordinate system.

25. The media device of claim 19, further configured to:

scan, with the media device, a third reference marker to receive third positional data of the third reference marker, the third positional data comprising a third uncertainty radius about a third preliminary coordinate, wherein the third uncertainty radius is based on a third resolution of the uncertainty of the third positional data;

calculate a second translation vector comprising the displacement from the first reference marker to the third reference marker;

determine, based on the third uncertainty radius, a third error area;

translate, from a point within the third error area, the reduced first error area, by the second translation vector; and determine an intersection area of the translated reduced first error area and the third error area, reduce the third error area to the intersection area.

26. The media device of claim 25, wherein scanning the first and second reference markers further comprises capturing, by a camera on the media device, the first and third reference markers, and the media device is further configured to:

store the first positional data and third positional data into a temporary local coordinate system stored on the media device; and perform, on the media device, a simultaneous learning and mapping (SLAM) algorithm to obtain an absolute distance between the first and third marker in the local coordinate system.

27. The media device of claim 26, wherein the media device is a second media device, different to the first media device.

28. A system for minimizing uncertainty in a location measurement, the system comprising:

input/output circuitry configured to:

scan, with a user device, a first reference marker to receive first positional data of the first reference marker, the first positional data comprising a first uncertainty radius about a first preliminary coordinate, wherein the first uncertainty radius is based on a first resolution of the uncertainty of the first positional data;

scan, with the user device, a second reference marker to receive second positional data of the second reference marker, the second positional data comprising a second uncertainty radius about a second preliminary coordinate, wherein the second uncertainty radius is based on a second resolution of the uncertainty of the second positional data; and processing circuitry configured to:

calculate a first translation vector comprising the displacement to the first reference marker from the second reference marker;

determine, based on the first uncertainty radius, a first error area;

determine, based on the second uncertainty radius, a second error area;

translate, from a point within the second error area, the second error area, by the first translation vector;

determine an intersection area of the translated second error area and the first error area; and reduce the first error area to the intersection area.

29. The system of claim 28, further comprising processing circuitry configured to iteratively repeating the translation and reduction of the error area.

30. The system of claim 29, further comprising processing circuitry configured to halt the iterative process when the first error area reaches a threshold.

31. The system of claim 30, wherein the threshold is based on an ideal error area size and/or a number of iterations.

32. The system of claim 28, wherein the processing circuitry configured to scan the first and second reference markers is further configured to capture, by a camera on a user device, the first and second reference markers, and the processing circuitry is further configured to store the first positional data and second positional data in a temporary local coordinate system stored on the user device.

33. The system of claim 32, further comprising processing circuitry configured to perform, on the user device, a simultaneous learning and mapping (SLAM) algorithm to obtain a displacement between the first and second marker in the local coordinate system.

34. The system of claim 28, further comprising processing circuitry configured to:

scan, with the user device, a third reference marker to receive third positional data of the third reference marker, the third positional data comprising a third uncertainty radius about a third preliminary coordinate, wherein the third uncertainty radius is based on a third resolution of the uncertainty of the third positional data;

calculate a second translation vector comprising the displacement from the first reference marker to the third reference marker;

determining, based on the third uncertainty radius, a third error area;

translate, from a point within the third error area, the reduced first error area, by the second translation vector; and determine an intersection area of the translated reduced first error area and the third error area, means for reducing the third error area to the intersection area.

35. The system of claim 34, wherein the processing circuitry configured to scan the first and second reference markers is further configured to capture, by a camera on a second user device, the first and third reference markers, and the processing circuitry is further configured to:

store the first positional data and third positional data into a temporary local coordinate system stored on the user device; and perform, on the user device, a simultaneous learning and mapping (SLAM) algorithm to obtain an absolute distance between the first and third marker in the local coordinate system.

36. The system of claim 35, wherein the user device is a second user device, different to the first user device.

* * * * *